(12) United States Patent
Chang et al.

(10) Patent No.: US 12,545,708 B2
(45) Date of Patent: Feb. 10, 2026

(54) PEPTIDE FOR TREATMENT OF CORONA VIRUS INFECTION DISEASE COVID-19 AND USE THEREOF

(71) Applicant: DAEGU GYEONGBUK INSTITUTE OF SCIENCE AND TECHNOLOGY, Daegu (KR)

(72) Inventors: Iksoo Chang, Daegu (KR); Mooseok Kang, Busan (KR); Ae Ree Lee, Daegu (KR); Souk Seo, Daegu (KR); Wookbong Kwon, Daegu (KR); Hee Yeon Kim, Daegu (KR); Song Park, Daegu (KR); Woo Kyung Yu, Daegu (KR); Young-Ho Lee, Daegu (KR); Sang Ho Ji, Daegu (KR); Seong Kyoon Choi, Daegu (KR); Min Gi Kim, Namhae-gun (KR); Sang Yeol Kim, Changwon-si (KR); Hyo Eun Kim, Gyeongsan-si (KR); Ga Hee Min, Daegu (KR); Seongjun Park, Changwon-si (KR); Myeong Won Oh, Daegu (KR); Kyung Eun Le, Daegu (KR); Juhwan Lee, Changwon-si (KR); Min Jee Choi, Ulsan (KR); Jae Seok Choi, Daegu (KR); Hyo Sub Chu, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 521 days.

(21) Appl. No.: 18/018,364

(22) PCT Filed: May 11, 2021

(86) PCT No.: PCT/KR2021/005880
§ 371 (c)(1),
(2) Date: Jan. 27, 2023

(87) PCT Pub. No.: WO2022/025398
PCT Pub. Date: Feb. 3, 2022

(65) Prior Publication Data
US 2023/0303627 A1    Sep. 28, 2023

(30) Foreign Application Priority Data
Jul. 28, 2020    (KR) ........................ 10-2020-0093594

(51) Int. Cl.
*A61K 38/17*    (2006.01)
*A61P 31/14*    (2006.01)
*C07K 14/00*    (2006.01)
*G01N 33/569*    (2006.01)

(52) U.S. Cl.
CPC ............ *C07K 14/001* (2013.01); *A61P 31/14* (2018.01); *G01N 33/56983* (2013.01); *G01N 2333/165* (2013.01)

(58) Field of Classification Search
None
See application file for complete search history.

(56) References Cited

U.S. PATENT DOCUMENTS

2018/0230447 A1    8/2018  Batlle et al.
2022/0009972 A1*   1/2022  Han ...................... C12N 9/485

FOREIGN PATENT DOCUMENTS

CN          111349150          6/2020

OTHER PUBLICATIONS

Mou, Hulhul et al, "THe receptor binding domain of the new middle east respiratory syndrome coronavirus maps to a 231 residue region in the spike protein that efficiently elicits neutralizing antibodies." J. Virol. (2013) 87(14) p. 9379-p. 9383.*
Vanpatten, Sonya et al., "Evidence supporting the use of peptides and peptidomimetics as potential SARS-CoV-2 (COVID-19) therapeutics", Future Medicinal Chemistry, val. 12, No. 18, Jul. 16, 2020 (Jul. 16, 2020), pp. 1647-1656.
Dong P. Han et al., "Identification of critical determinants on ACE2 for SARS-CoV entry and development of a potent entry inhibitor", Virology, Elsevier, Amsterdam, NL, val. 350, No. 1, Jun. 20, 2006 (Jun. 20, 2006), pp. 15-25.

(Continued)

*Primary Examiner* — Fred H Reynolds
(74) *Attorney, Agent, or Firm* — LEX IP MEISTER, PLLC

(57) ABSTRACT

The present invention relates to a peptide for treatment of the corona virus infection COVID-19 and a use thereof. In order to make the binding to the new epitope of SARS-CoV2 RBD stronger compared to the peptide (P6) simulating the conventionally known binding site between SARS-CoV RBD and ACE2, the peptide of the present invention includes a new portion added with a novel amino acid sequence fundamentally designed for interaction in the dimension of atoms consisting of the amino acids. Suggested in the present invention is a novel design of a peptide having higher binding affinity than conventionally known peptides, wherein an expanded peptide is creatively designed to additionally interact with charged amino acids of D420 and K458, located at the rear side of the known binding boundary between RBD and hACE2. The peptide of the present invention exhibits high possibility as a therapeutic agent for COVID-19.

7 Claims, 15 Drawing Sheets
Specification includes a Sequence Listing.

(56) References Cited

OTHER PUBLICATIONS

Wei Lu et al., "Synthetic peptides derived from SARS coronavirus S protein with diagnostic and therapeutic potential", FEBS Letters, Elsevier, Amsterdam, NL, val. 579, No. 10, Mar. 13, 2005 (Mar. 13, 2005), pp. 2130-2136.
Yanxiao Han et al., "Computational design of ACE2-based peptide inhibitors of SARS-CoV-2" ACS nano 14.4 (Apr. 14, 2020): 5143-5147.
Mirza S.Baig et al., "Identification of a potential peptide inhibitor of SARS-CoV-2 targeting its entry into the host cells" Drugs in R&D 20.3 (Jun. 26, 2020): 161-169.
Debmalya Barh et al., "Potential chimeric peptides to block the SARS-CoV-2 spike receptor-binding domain" F1000Research 2020, 9:576 (Jun. 9, 2020).
Rolando Cannalire et al., "SARS-CoV-2 entry inhibitors: Small molecules and peptides targeting virus or host cells" International Journal of Molecular Sciences 21.16 (Aug. 9, 2020): 5707.
G. Zhang et al., "The first-in-class peptide binder to the SARS-CoV-2 spike protein" BioRxiv 10.2020.03 (Mar. 20, 2020): 19-999318.

\* cited by examiner

FIG. 1
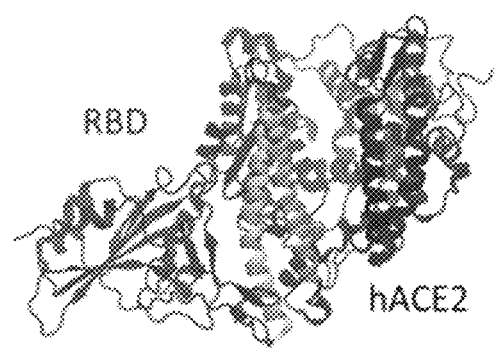
P6  ----------------------EEQAKTFLDKFNHEAEDLFYQSSGLGKGDFR (SEQ ID NO: 1)
PEP9 MKSQLADNVYNTNITKENVQNMNEEQAKTFLDKFNHEAEDLFYQSSGLGKGDFR (SEQ ID NO: 3)
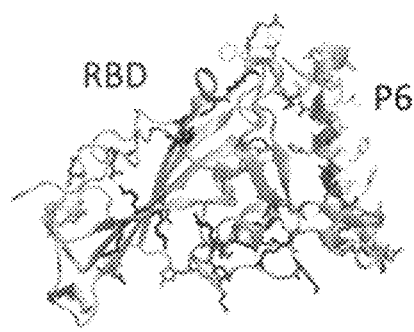 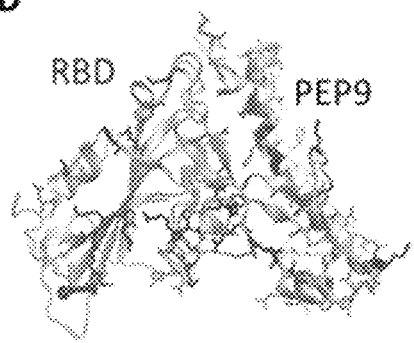

FIG. 2
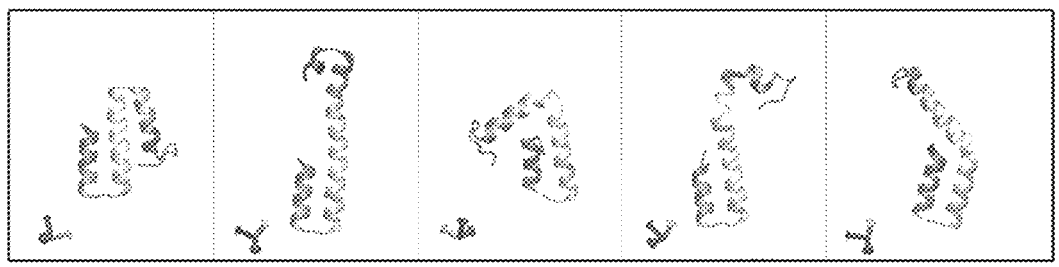
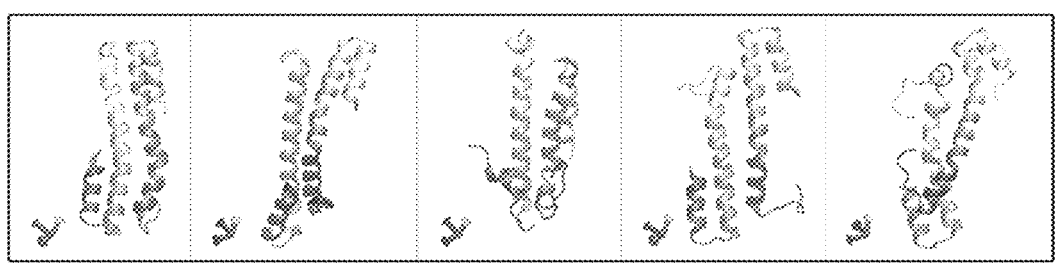
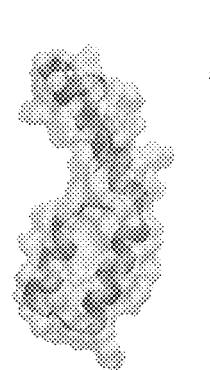 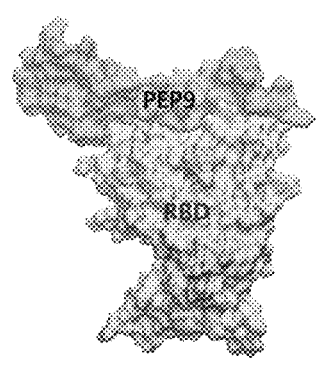 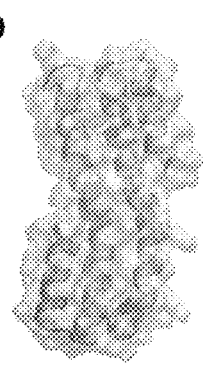 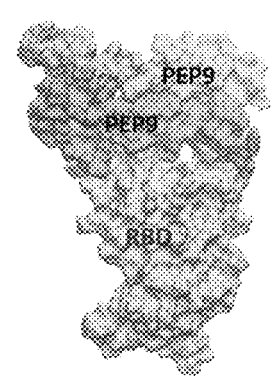
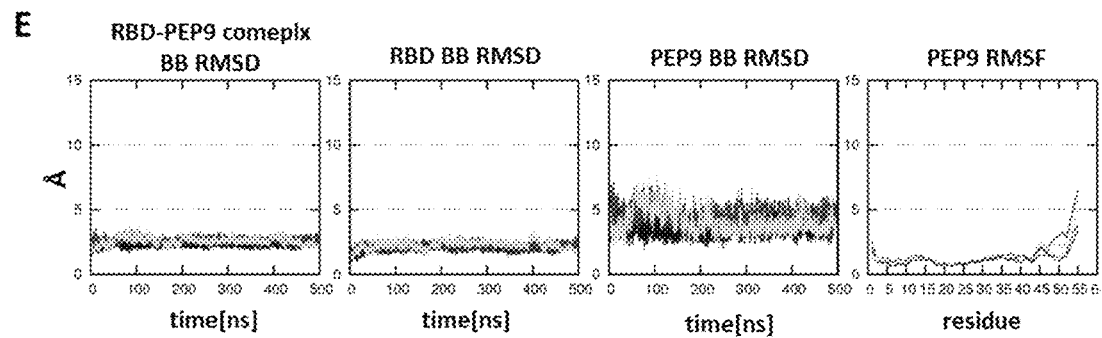

FIG. 3
A
| Species | Human | | Chimpanzee | | Rhesus macaque | |
|---|---|---|---|---|---|---|
| Scan length (mer) | 13 | 14 | 13 | 14 | 13 | 14 |
| Total | 3402 | 3321 | 336 | 328 | 774 | 756 |
| SB | 6 | 10 | 1 | 0 | 4 | 6 |
| WB | 22 | 28 | 1 | 5 | 19 | 26 |
| SB+WB | 28 | 38 | 2 | 5 | 23 | 32 |
| (SB+WB)/Total | 0.008 | 0.011 | 0.006 | 0.015 | 0.030 | 0.042 |
| Species | Mouse | | BoLA | | Pig | |
| Scan length (mer) | 13 | 14 | 13 | 14 | 13 | 14 |
| Total | 258 | 252 | 258 | 252 | 126 | 123 |
| SB | 1 | 1 | 0 | 0 | 0 | 0 |
| WB | 12 | 14 | 0 | 0 | 0 | 1 |
| SB+WB | 13 | 15 | 0 | 0 | 0 | 1 |
| (SB+WB)/Total | 0.050 | 0.060 | 0 | 0 | 0 | 0.008 |
B
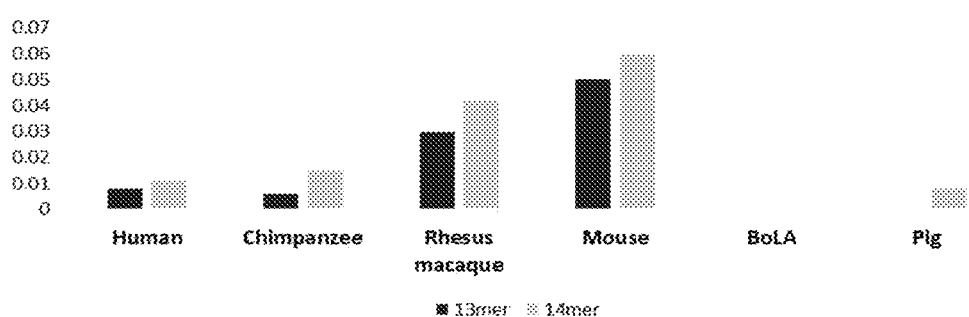
C
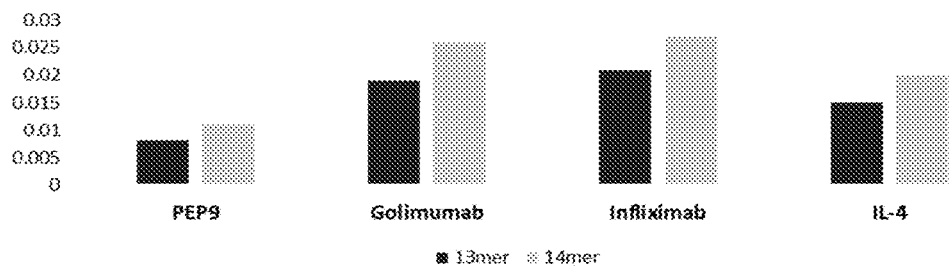

FIG. 4
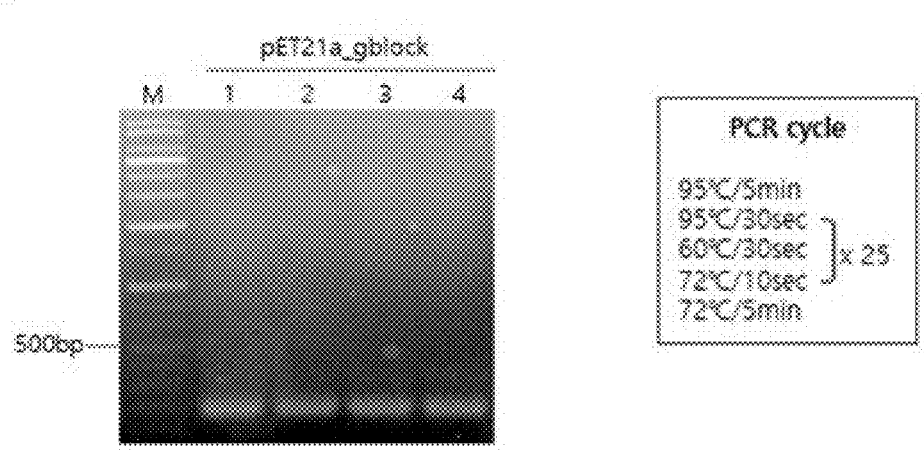
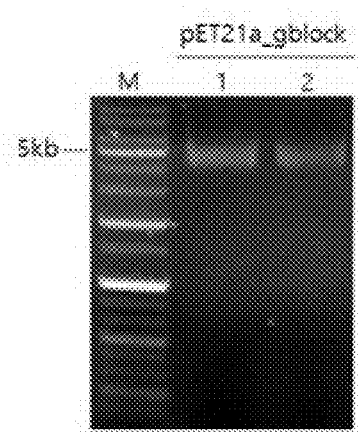

FIG. 5

CAtatgaaagtcaacttgctgataatgtgtataacaccaatattactaaagagaatgtccaaaacatgaatgaagaacaggccaagacatt
ttggacaagttaaccacgaagccgaagccctgttctatcaaagtcaggcctgggaagggcgactcaggCTCGAGCACCACCA
CCACCACCAC (SEQ ID NO: 4)

NdeI-PEP3-XhoI-6xHis

FIG. 9

▶ RBD Sequence annotation(69.69% sequence coverage) Trypsin, Glycosylation

RVQPTESIVRFPNITNLCPFGEVFNATRFASVYAWNRKRISNCVADYSVLYNSASFSTFKCYGVSPT
KLNDLCFTNVYADSFVIRGDEVRQIAPGQTGKIADYNYKLPDDFTGCVIAWNSNNLDSKVGGNY
NYLYRLFRKSNLKPFERDISTEIYQAGSTPCNGVEGFNCYFPLQSYGFQPTNGVGYQPYRVVVLSFE
LLHAPATVCGPKKSTNLVKNKCVNFHHHHHH (SEQ ID NO: 5)

▶ hACE2 Sequence annotation(84.26% sequence coverage) Glu-C, Trypsin, Glycosylation QSTIEEQAKTFLDKFNHEAEDLFYQSSLASWNYNTNITEENVQNMNNAGDKWSAFLKEQSTLAQ
MYPLQEIQNLTVKLQLQALQQNGSSVLSEDKSKRLNTILNTMSTIYSTGKVCNPDNPQECLLLEPGL
NEIMANSLDYNERLWAWESWRSEVGKQLRPLYEEYVVLKNEMARANHYEDYGDYWRGDYEVN
GVDGYDYSRGQLIEDVEHTFEEIKPLYEHLHAYVRAKLMNAYPSYISPIGCLPAHLLGDMWGRFWT
NLYSLTVPFGQKPNIDVTDAMVDQAWDAQRIFKEAEKFFVSVGLPNMTQGFWENSMLTDPGNV
QKAVCHPTAWDLGKGDFRILMCTKVTMDDFLTAHHEMGHIQYDMAYAAQPFLLRNGANEGFHE
AVGEIMSLSAATPKHLKSIGLLSPDFQEDNETEINFLLKQALTIVGTLPFTYMLEKWRWMVFKGEIPK
DQWMKKWWEMKREIVGVVEPVPHDETYCDPASLFHVSNDYSFIRYYTRTLYQFQFQEALCQAAK
HEGPLHKCDISNSTEAGQKLFNMLRLGKSEPWTLALENVVGAKNMNVRPLLNYFEPLFTWLKDQ
NKNSFVGWSTDWSPYADQSIKVRISLKSALGDKAYEWNDNEMYLFRSSVAYAMRQYFLKVKNQ
MILFGEEDVRVANLKPRISFNFFVTAPKNVSDIIPRTEVEKAIRMSRSRINDAFRLNDNSLEFLGIQPT
LGPPNQPPVSHHHHHH (SEQ ID NO: 6)

▶ Pep9 Sequence annotation (100% sequence coverage) Glu-C,

MKSQLADNVYNTNITKENVQNMNEEQAKTFLDKFNHEAEDLFYQSSGLGKGDFRLEHHHHHH
(SEQ ID NO: 7)

```
                        SEQUENCE LISTING

<160> NUMBER OF SEQ ID NOS: 7

<210> SEQ ID NO 1
<211> LENGTH: 54
<212> TYPE: PRT
<213> ORGANISM: Artificial Sequence
<220> FEATURE:
<223> OTHER INFORMATION: PEP9 peptide

<400> SEQUENCE: 1

Met Lys Ser Gln Leu Ala Asp Asn Val Tyr Asn Thr Asn Ile Thr Lys
1               5                   10                  15

Glu Asn Val Gln Asn Met Asn Glu Glu Gln Ala Lys Thr Phe Leu Asp
            20                  25                  30

Lys Phe Asn His Glu Ala Glu Asp Leu Phe Tyr Gln Ser Ser Gly Leu
        35                  40                  45

Gly Lys Gly Asp Phe Arg
    50

<210> SEQ ID NO 2
<211> LENGTH: 162
<212> TYPE: DNA
<213> ORGANISM: Artificial Sequence
<220> FEATURE:
<223> OTHER INFORMATION: PEP9 peptide

<400> SEQUENCE: 2
atgaaaagtc aacttgctga taatgtgtat aacaccaata ttactaaaga gaatgtccaa        60
aacatgaatg aggaacaggc caagacattt ttggacaagt taaccacga agccgaagac       120 ctgttctatc aaagttcagg cctggggaag ggcgacttca gg                         162

<210> SEQ ID NO 3
<211> LENGTH: 31
<212> TYPE: PRT
<213> ORGANISM: Artificial Sequence
<220> FEATURE:
<223> OTHER INFORMATION: P6

<400> SEQUENCE: 3

Glu Glu Gln Ala Lys Thr Phe Leu Asp Lys Phe Asn His Glu Ala Glu
1               5                   10                  15

Asp Leu Phe Tyr Gln Ser Ser Gly Leu Gly Lys Gly Asp Phe Arg
```

```
                    20                  25                  30
```

<210> SEQ ID NO 4
<211> LENGTH: 189
<212> TYPE: DNA
<213> ORGANISM: Artificial Sequence
<220> FEATURE:
<223> OTHER INFORMATION: Fig.5 PEP9

<400> SEQUENCE: 4

```
catatgaaaa gtcaacttgc tgataatgtg tataacacca atattactaa agagaatgtc      60
caaaacatga atgaggaaca ggccaagaca ttttggaca agtttaacca cgaagccgaa      120
gacctgttct atcaaagttc aggcctgggg aagggcgact tcaggctcga gcaccaccac    180
caccaccac                                                               189
```

<210> SEQ ID NO 5
<211> LENGTH: 229
<212> TYPE: PRT
<213> ORGANISM: Artificial Sequence
<220> FEATURE:
<223> OTHER INFORMATION: FIG. 9 RBD Sequence annotation

<400> SEQUENCE: 5

```
Arg Val Gln Pro Thr Glu Ser Ile Val Arg Phe Pro Asn Ile Thr Asn
1               5                   10                  15

Leu Cys Pro Phe Gly Glu Val Phe Asn Ala Thr Arg Phe Ala Ser Val
            20                  25                  30

Tyr Ala Trp Asn Arg Lys Arg Ile Ser Asn Cys Val Ala Asp Tyr Ser
        35                  40                  45

Val Leu Tyr Asn Ser Ala Ser Phe Ser Thr Phe Lys Cys Tyr Gly Val
    50                  55                  60

Ser Pro Thr Lys Leu Asn Asp Leu Cys Phe Thr Asn Val Tyr Ala Asp
65                  70                  75                  80

Ser Phe Val Ile Arg Gly Asp Glu Val Arg Gln Ile Ala Pro Gly Gln
                85                  90                  95

Thr Gly Lys Ile Ala Asp Tyr Asn Tyr Lys Leu Pro Asp Asp Phe Thr
            100                 105                 110

Gly Cys Val Ile Ala Trp Asn Ser Asn Asn Leu Asp Ser Lys Val Gly
        115                 120                 125

Gly Asn Tyr Asn Tyr Leu Tyr Arg Leu Phe Arg Lys Ser Asn Leu Lys
    130                 135                 140

Pro Phe Glu Arg Asp Ile Ser Thr Glu Ile Tyr Gln Ala Gly Ser Thr
145                 150                 155                 160

Pro Cys Asn Gly Val Glu Gly Phe Asn Cys Tyr Phe Pro Leu Gln Ser
                165                 170                 175

Tyr Gly Phe Gln Pro Thr Asn Gly Val Gly Tyr Gln Pro Tyr Arg Val
            180                 185                 190

Val Val Leu Ser Phe Glu Leu Leu His Ala Pro Ala Thr Val Cys Gly
        195                 200                 205

Pro Lys Lys Ser Thr Asn Leu Val Lys Asn Lys Cys Val Asn Phe His
    210                 215                 220

His His His His
225
```

<210> SEQ ID NO 6
<211> LENGTH: 729
<212> TYPE: PRT

<213> ORGANISM: Artificial Sequence
<220> FEATURE:
<223> OTHER INFORMATION: FIG. 9 hACE2 Sequence annotation

<400> SEQUENCE: 6

```
Gln Ser Thr Ile Glu Glu Gln Ala Lys Thr Phe Leu Asp Lys Phe Asn
1               5                   10                  15

His Glu Ala Glu Asp Leu Phe Tyr Gln Ser Ser Leu Ala Ser Trp Asn
            20                  25                  30

Tyr Asn Thr Asn Ile Thr Glu Glu Asn Val Gln Asn Met Asn Asn Ala
        35                  40                  45

Gly Asp Lys Trp Ser Ala Phe Leu Lys Glu Gln Ser Thr Leu Ala Gln
50                  55                  60

Met Tyr Pro Leu Gln Glu Ile Gln Asn Leu Thr Val Lys Leu Gln Leu
65                  70                  75                  80

Gln Ala Leu Gln Gln Asn Gly Ser Ser Val Leu Ser Glu Asp Lys Ser
                85                  90                  95

Lys Arg Leu Asn Thr Ile Leu Asn Thr Met Ser Thr Ile Tyr Ser Thr
            100                 105                 110

Gly Lys Val Cys Asn Pro Asp Asn Pro Gln Glu Cys Leu Leu Leu Glu
        115                 120                 125

Pro Gly Leu Asn Glu Ile Met Ala Asn Ser Leu Asp Tyr Asn Glu Arg
130                 135                 140

Leu Trp Ala Trp Glu Ser Trp Arg Ser Glu Val Gly Lys Gln Leu Arg
145                 150                 155                 160

Pro Leu Tyr Glu Glu Tyr Val Val Leu Lys Asn Glu Met Ala Arg Ala
                165                 170                 175

Asn His Tyr Glu Asp Tyr Gly Asp Tyr Trp Arg Gly Asp Tyr Glu Val
            180                 185                 190

Asn Gly Val Asp Gly Tyr Asp Tyr Ser Arg Gly Gln Leu Ile Glu Asp
        195                 200                 205

Val Glu His Thr Phe Glu Glu Ile Lys Pro Leu Tyr Glu His Leu His
210                 215                 220

Ala Tyr Val Arg Ala Lys Leu Met Asn Ala Tyr Pro Ser Tyr Ile Ser
225                 230                 235                 240

Pro Ile Gly Cys Leu Pro Ala His Leu Leu Gly Asp Met Trp Gly Arg
                245                 250                 255

Phe Trp Thr Asn Leu Tyr Ser Leu Thr Val Pro Phe Gly Gln Lys Pro
            260                 265                 270

Asn Ile Asp Val Thr Asp Ala Met Val Asp Gln Ala Trp Asp Ala Gln
        275                 280                 285

Arg Ile Phe Lys Glu Ala Glu Lys Phe Phe Val Ser Val Gly Leu Pro
290                 295                 300

Asn Met Thr Gln Gly Phe Trp Glu Asn Ser Met Leu Thr Asp Pro Gly
305                 310                 315                 320

Asn Val Gln Lys Ala Val Cys His Pro Thr Ala Trp Asp Leu Gly Lys
                325                 330                 335

Gly Asp Phe Arg Ile Leu Met Cys Thr Lys Val Thr Met Asp Asp Phe
            340                 345                 350

Leu Thr Ala His His Glu Met Gly His Ile Gln Tyr Asp Met Ala Tyr
        355                 360                 365

Ala Ala Gln Pro Phe Leu Leu Arg Asn Gly Ala Asn Glu Gly Phe His
370                 375                 380

Glu Ala Val Gly Glu Ile Met Ser Leu Ser Ala Ala Thr Pro Lys His
```

```
                385                 390                 395                 400
Leu Lys Ser Ile Gly Leu Leu Ser Pro Asp Phe Gln Glu Asp Asn Glu
                    405                 410                 415

Thr Glu Ile Asn Phe Leu Leu Lys Gln Ala Leu Thr Ile Val Gly Thr
                420                 425                 430

Leu Pro Phe Thr Tyr Met Leu Glu Lys Trp Arg Trp Met Val Phe Lys
            435                 440                 445

Gly Glu Ile Pro Lys Asp Gln Trp Met Lys Lys Trp Trp Glu Met Lys
        450                 455                 460

Arg Glu Ile Val Gly Val Val Glu Pro Val Pro His Asp Glu Thr Tyr
465                 470                 475                 480

Cys Asp Pro Ala Ser Leu Phe His Val Ser Asn Asp Tyr Ser Phe Ile
                485                 490                 495

Arg Tyr Tyr Thr Arg Thr Leu Tyr Gln Phe Gln Phe Gln Glu Ala Leu
                500                 505                 510

Cys Gln Ala Ala Lys His Glu Gly Pro Leu His Lys Cys Asp Ile Ser
            515                 520                 525

Asn Ser Thr Glu Ala Gly Gln Lys Leu Phe Asn Met Leu Arg Leu Gly
        530                 535                 540

Lys Ser Glu Pro Trp Thr Leu Ala Leu Glu Asn Val Val Gly Ala Lys
545                 550                 555                 560

Asn Met Asn Val Arg Pro Leu Leu Asn Tyr Phe Glu Pro Leu Phe Thr
                565                 570                 575

Trp Leu Lys Asp Gln Asn Lys Asn Ser Phe Val Gly Trp Ser Thr Asp
                580                 585                 590

Trp Ser Pro Tyr Ala Asp Gln Ser Ile Lys Val Arg Ile Ser Leu Lys
            595                 600                 605

Ser Ala Leu Gly Asp Lys Ala Tyr Glu Trp Asn Asp Asn Glu Met Tyr
        610                 615                 620

Leu Phe Arg Ser Ser Val Ala Tyr Ala Met Arg Gln Tyr Phe Leu Lys
625                 630                 635                 640

Val Lys Asn Gln Met Ile Leu Phe Gly Glu Glu Asp Val Arg Val Ala
                645                 650                 655

Asn Leu Lys Pro Arg Ile Ser Phe Asn Phe Phe Val Thr Ala Pro Lys
                660                 665                 670

Asn Val Ser Asp Ile Ile Pro Arg Thr Glu Val Glu Lys Ala Ile Arg
            675                 680                 685

Met Ser Arg Ser Arg Ile Asn Asp Ala Phe Arg Leu Asn Asp Asn Ser
        690                 695                 700

Leu Glu Phe Leu Gly Ile Gln Pro Thr Leu Gly Pro Pro Asn Gln Pro
705                 710                 715                 720

Pro Val Ser His His His His His His
                725

<210> SEQ ID NO 7
<211> LENGTH: 62
<212> TYPE: PRT
<213> ORGANISM: Artificial Sequence
<220> FEATURE:
<223> OTHER INFORMATION: FIG. 9 Pep9 Sequence

<400> SEQUENCE: 7

Met Lys Ser Gln Leu Ala Asp Asn Val Tyr Asn Thr Asn Ile Thr Lys
1               5                   10                  15

Glu Asn Val Gln Asn Met Asn Glu Glu Gln Ala Lys Thr Phe Leu Asp
```

-continued

```
                20                  25                  30
Lys Phe Asn His Glu Ala Glu Asp Leu Phe Tyr Gln Ser Ser Gly Leu
            35                  40                  45

Gly Lys Gly Asp Phe Arg Leu Glu His His His His His His
        50                  55                  60
```

PEPTIDE FOR TREATMENT OF CORONA VIRUS INFECTION DISEASE COVID-19 AND USE THEREOF

TECHNICAL FIELD

The present disclosure relates to a peptide for treatment of corona virus infection COVID-19 and a use thereof.

BACKGROUND ART

Corona virus SARS-CoV2, which causes COVID-19 disease, binds to an angiotensin-converting enzyme 2 (hACE2) protein which is mainly present in human lung epithelial cells and invades into cells to replicate the viral genetic material in human cells to reproduce the virus. A fundamental way to treat COVID-19 infection is to find strategies to prevent the corona virus from entering human cells.

The spike protein S1-RBD (Receptor Binding Domain) present on the surface of corona virus binds to a hACE2 protein, wherein the 3D bound structure has been revealed by recent studies (Jun Lan, et al., Nature, 2020).

Cell invasion of corona virus may be fundamentally deterred by blocking binding between RBD and hACE2, and it is possible to treat COVID-19 infection by dramatically lowering the activity of corona virus or eliminating infectivity thereof. Methods of neutralizing RBD of corona virus is being actively studied as one of the principles of development for therapeutic agents.

The methods of neutralizing RBD are being studied to make other substances bind to RBD in advance instead of hACE2 so as to prevent RBD from binding to hACE2 on the cell surface. Developed or proposed as an RBD neutralizing therapeutic agent based on the existing hACE2 is human recombinant soluble ACE2 (hrsACE2=APN01) which is used as a lung cancer treatment. Also, idea-oriented peptide therapeutic agents have been proposed, most of which are designed based on mimicking only the binding site of hACE2. Accordingly, there is a need to develop peptide therapeutic agents capable of binding to RBD more strongly than the previously presented peptide therapeutic agent.

DISCLOSURE OF THE INVENTION

Technical Goals

The present disclosure relates to a peptide for treatment of corona virus infection COVID-19 and a use thereof, and an object of the present disclosure is to provide a peptide which includes an amino acid sequence represented by SEQ ID NO: 1 and specifically binds to a receptor binding domain (RBD) of corona virus, a composition for diagnosing corona virus infection including the peptide as an active ingredient, a pharmaceutical composition for preventing or treating corona virus infection, a health functional food composition for preventing or ameliorating corona virus infection, and a composition for drug delivery.

Technical Solutions

In order to solve the above problems, the present disclosure provides a peptide which includes an amino acid sequence represented by SEQ ID NO: 1 and specifically binds to a receptor binding domain (RBD) of corona virus.

In addition, the present disclosure provides a polynucleotide encoding the peptide, a recombinant vector including the polynucleotide, and a transformant (except for humans) transformed with the recombinant vector.

In addition, the present disclosure provides a composition for diagnosing corona virus infection, including the peptide as an active ingredient.

In addition, the present disclosure provides a pharmaceutical composition for preventing or treating corona virus infection, including the peptide as an active ingredient.

In addition, the present disclosure provides a health functional food composition for preventing or ameliorating corona virus infection, including the peptide as an active ingredient.

In addition, the present disclosure provides a composition for drug delivery, including the peptide as an active ingredient.

Advantageous Effects

The present disclosure relates to a peptide for treatment of corona virus infection COVID-19 and a use thereof. In order to make the binding to a new epitope of SARS-CoV2 RBD stronger compared to the peptide (P6) mimicking the previously known binding site between SARS-CoV RBD and ACE2, the peptide of the present disclosure includes a new portion added with a novel amino acid sequence fundamentally designed for interaction in the dimension of atoms consisting of the amino acids. Suggested in the present disclosure is a novel design of a peptide with stronger binding affinity than previously known peptides by uniquely designing an expanded peptide capable of additionally interacting with charged amino acids of D420 and K458, located at the rear side of the previously known binding boundary between RBD and hACE2, such that peptide of the present disclosure exhibits high applicability as a therapeutic agent for COVID-19.

BRIEF DESCRIPTION OF DRAWINGS

FIG. 1 shows structures of RBD, hACE2, P6, and PEP9. (A) A binding structure of RBD and hACE2 and a portion binding to RBD in hACE2 (19-18), (B) amino acid sequences of P6 and PEP9, (C) a binding modeling structure of RBD-P6, and (D) a binding modeling structure of RBD-PEP9.

FIG. 2 shows structural ensembles of PEP9. (A) Structural ensembles that PEP9 monomer may have, (B) a structural ensemble that PEP9 dimer may have, (C) PEP9 monomer (left) and a binding structure with RBD (right), (D) PEP9 dimer (left) and a binding structure with RBD (right), and (E) RMSD (Root Mean Square Deviation) and RMSF (Root Mean Square Fluctuation) for the positions of atoms constituting a protein during molecular dynamics simulation for RBD-PEP9 monomer complex.

FIG. 3 shows results of the immunogenicity prediction test of PEP9. (A) iImmunogenicity test data by species of PEP9, (B) comparison of immunogenicity according by species of PEP9, and (C) comparison of immunogenicity of PEP9 and other protein drugs (as a control) against human allel. Prediction on human immunostability of PEP9.

FIG. 4 shows cloning results of PEP9. (A) Conditions and results of colony PCR, and (B) a result of purified plasmid electrophoresis used in sequencing.

FIG. 5 shows a DNA sequence of a completed PEP9 plasmid.

insoluble solution, Lane 1-9: results of PEP9 purified by Ni-IMAC, and (B) a result of PEP9 purified by ion exchange chromatography (IEX).

Figure 7:
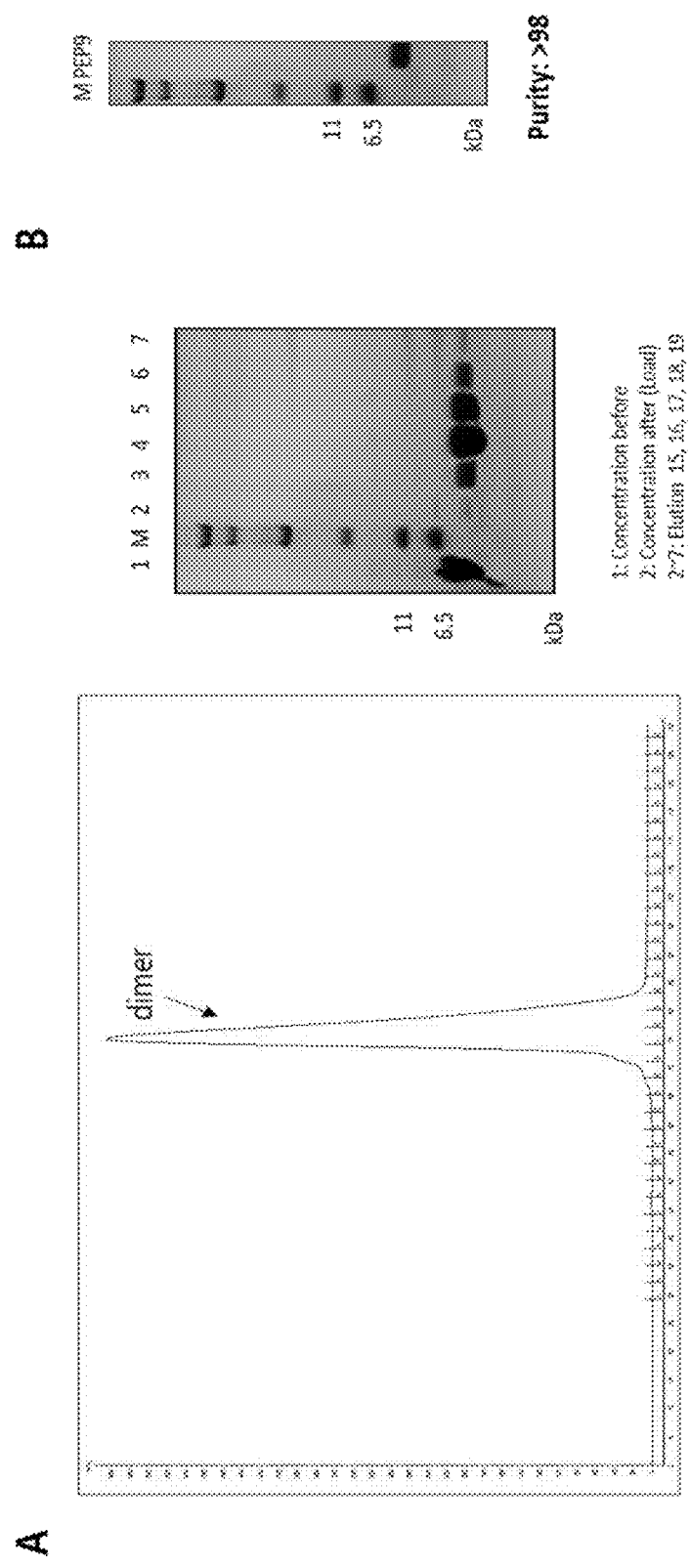

FIG. 7 shows results of SEC purified by a HiLoad Superdex 75 16/600 column. (A) A result of SDS-PAGE for purely isolated and purified PEP9 having a dimer structure, and (B) a result of SDS-PAGE for finally purified PEP9 with 98% purity.

Figure 8:
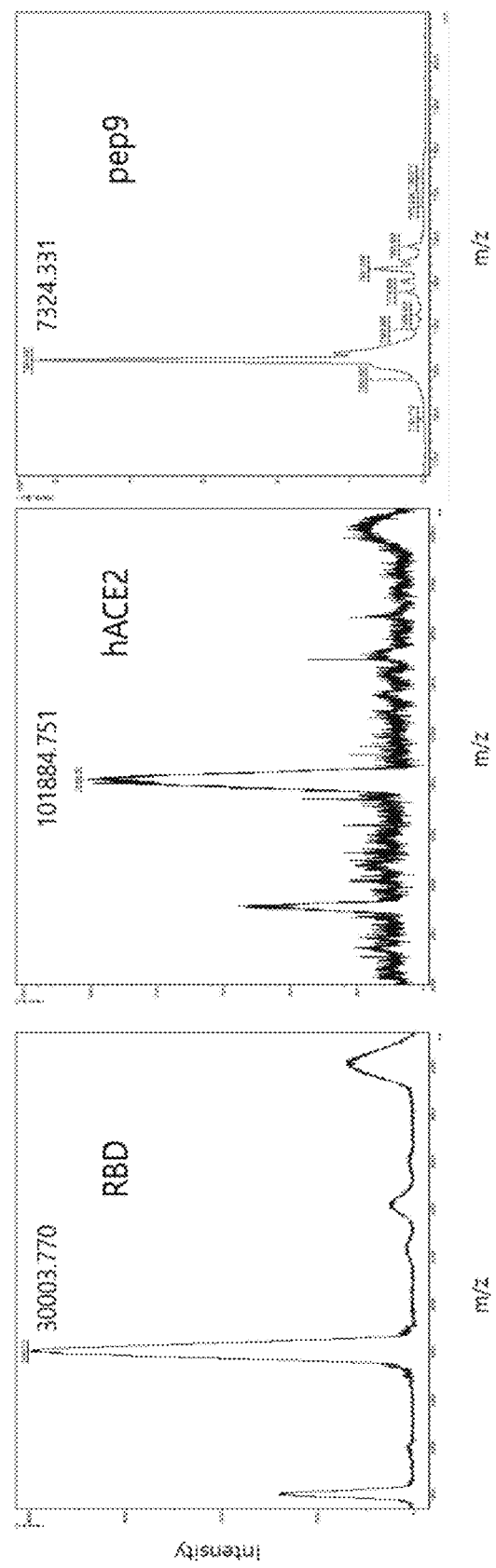

FIG. 8 shows results of intact mass spectrometry.

FIG. 9 shows sequences of proteins identified using LC-MS/MS analysis. The underline refers to a sequence identified by cleavage with trypsin, the light gray letter refers to a sequence identified by cleavage with Glu-C, and the gray highlight refers to amino acid sequences identified by N-linked glycosylation.

Figure 10:
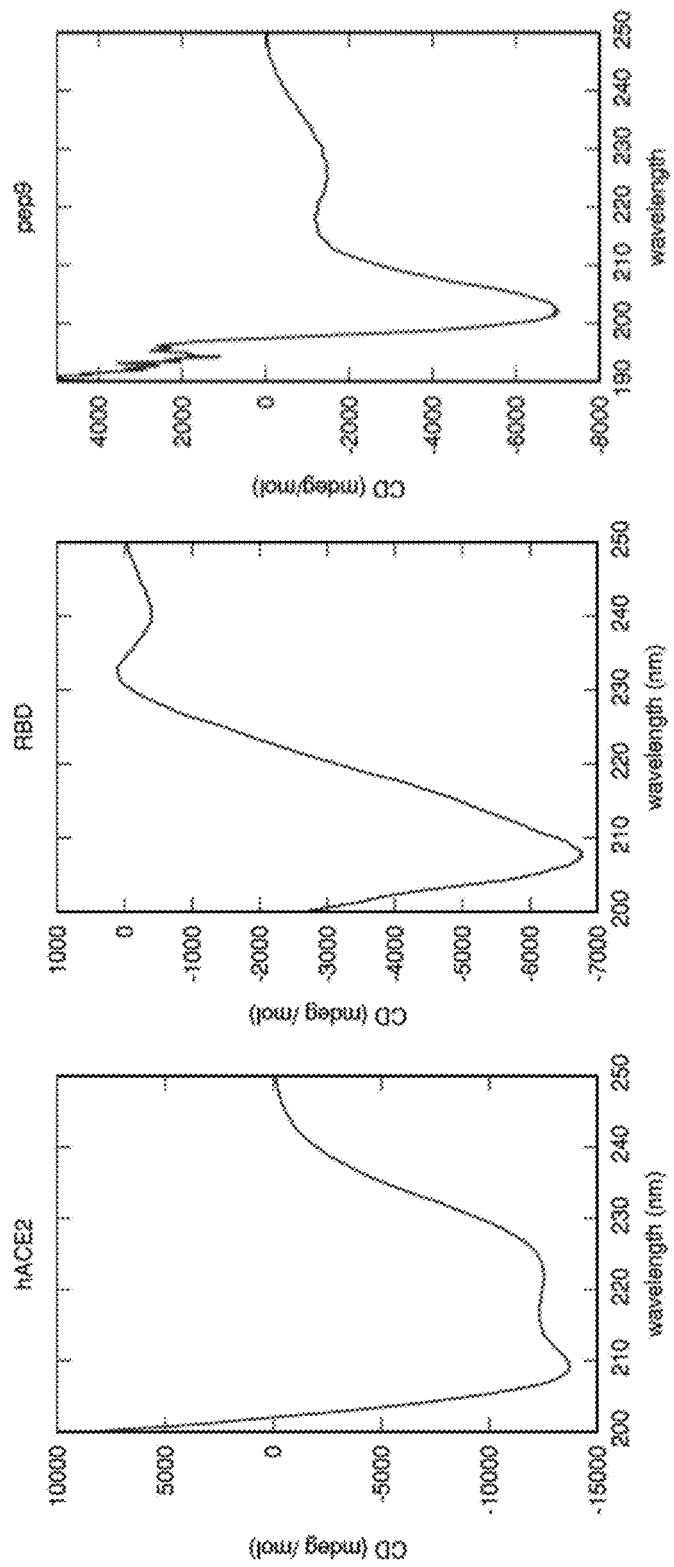

FIG. 10 shows the far UV CD spectra of hACE2, RBD, and PEP9.

Figure 11:
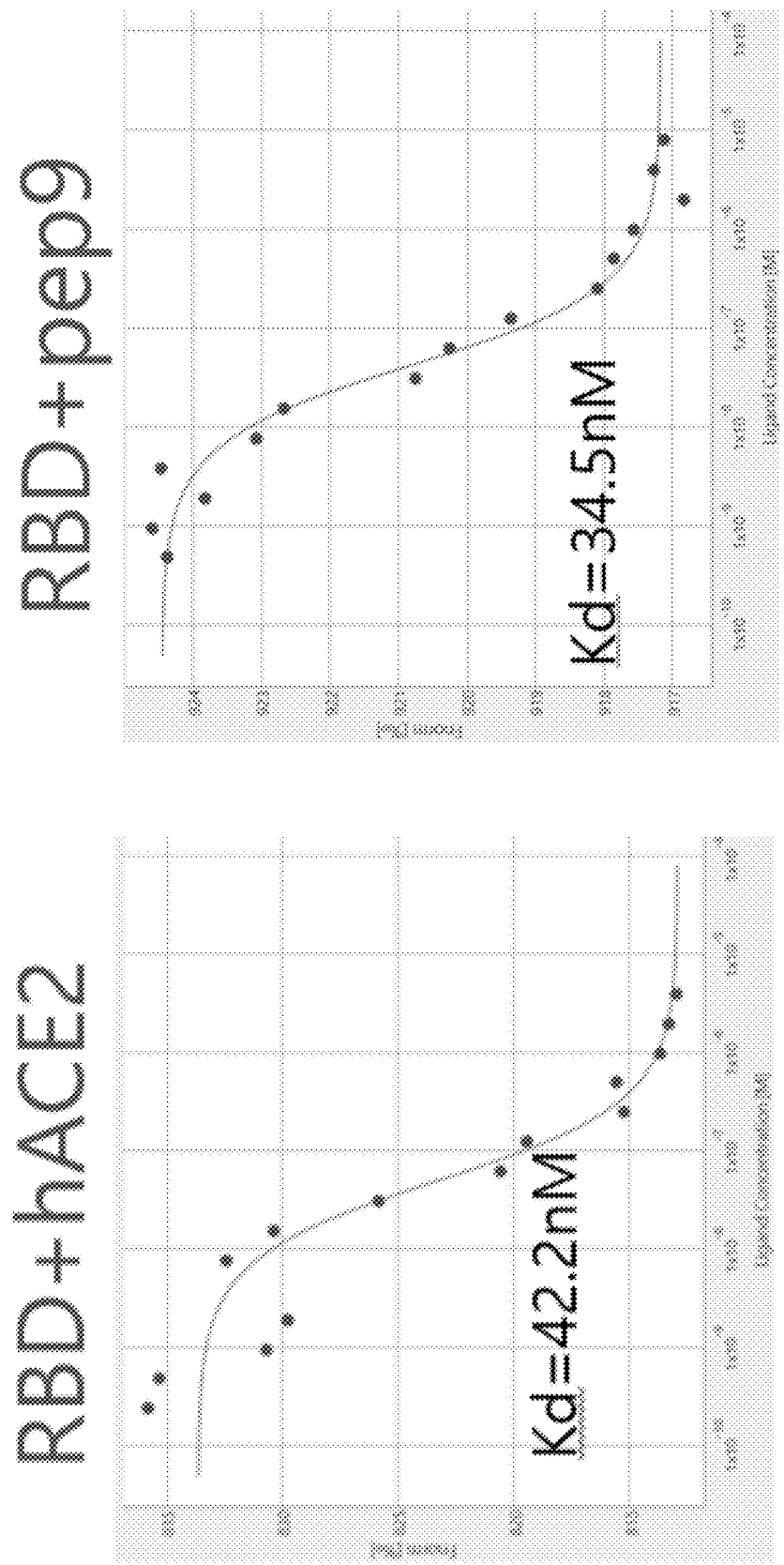
Figure 12A:
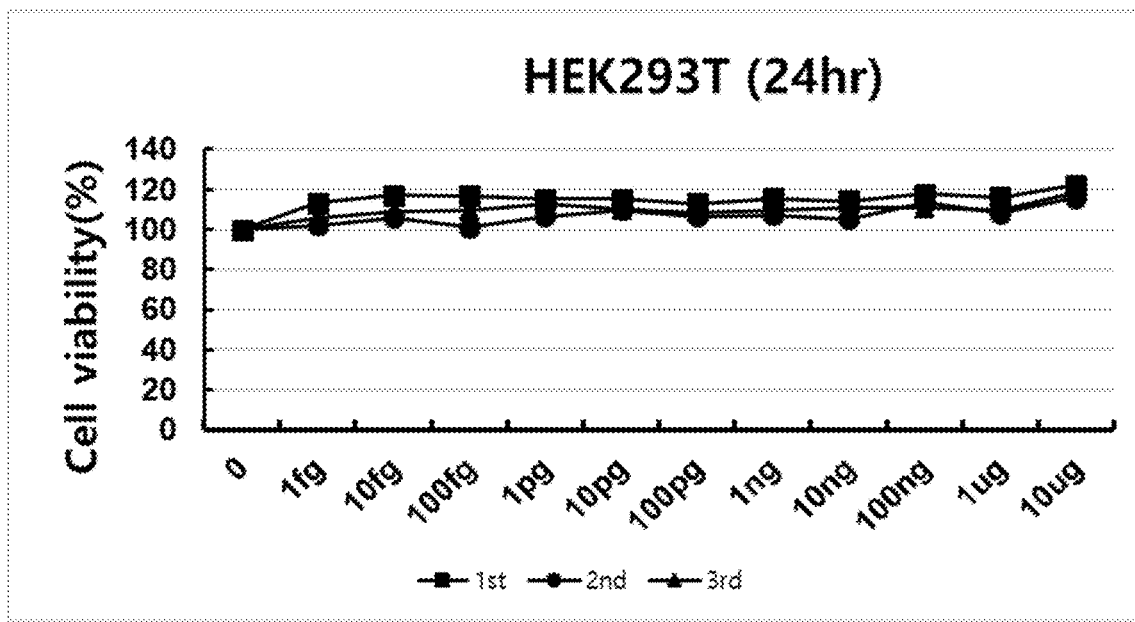
Figure 12B:
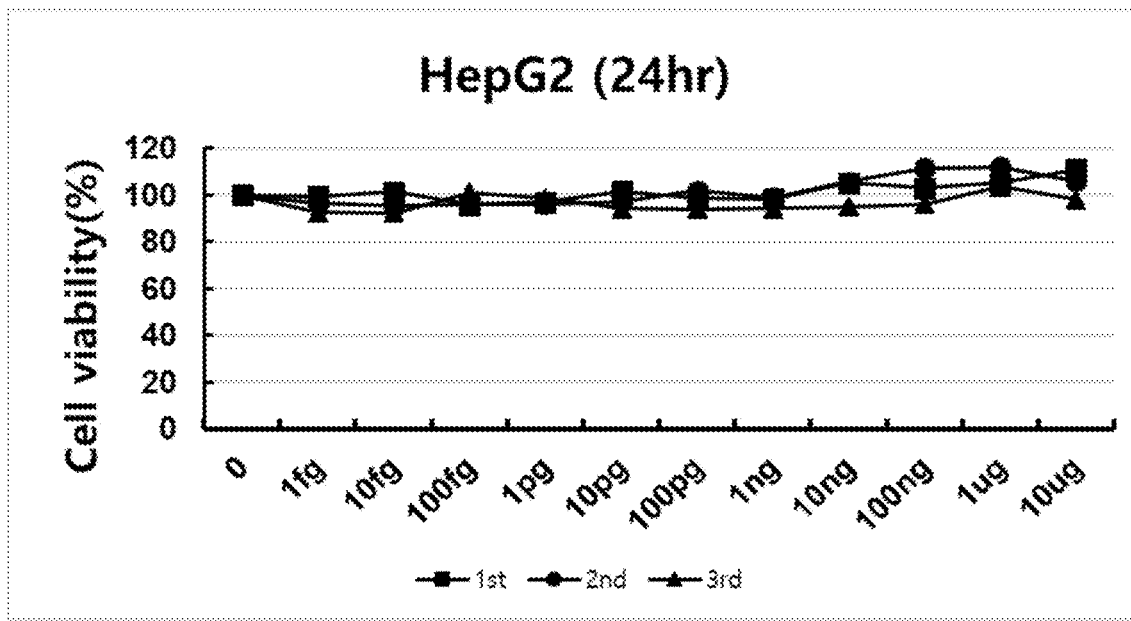
Figure 12C:
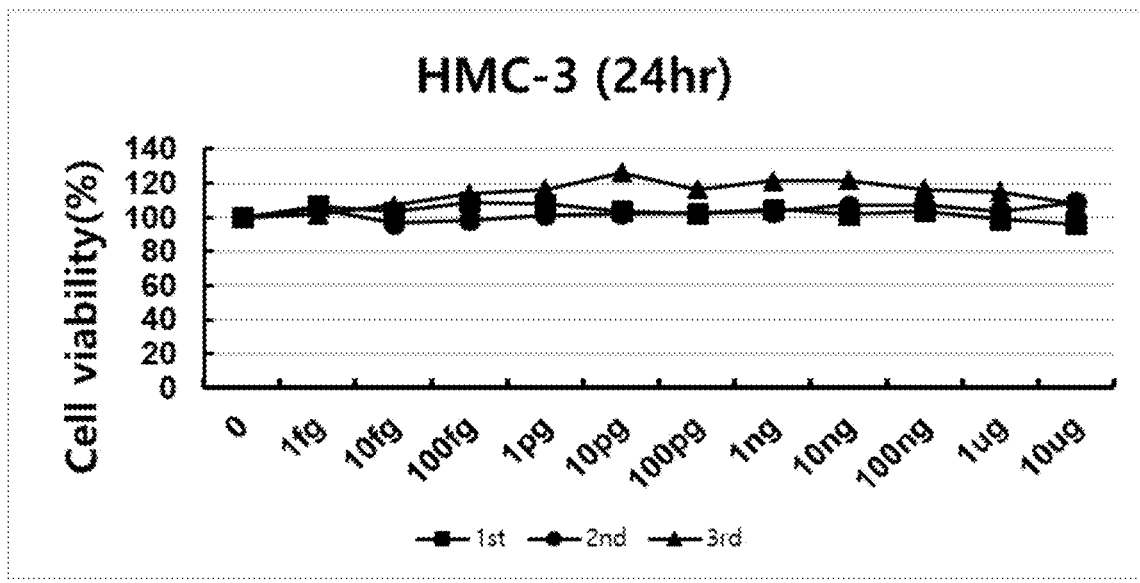
Figure 12D:
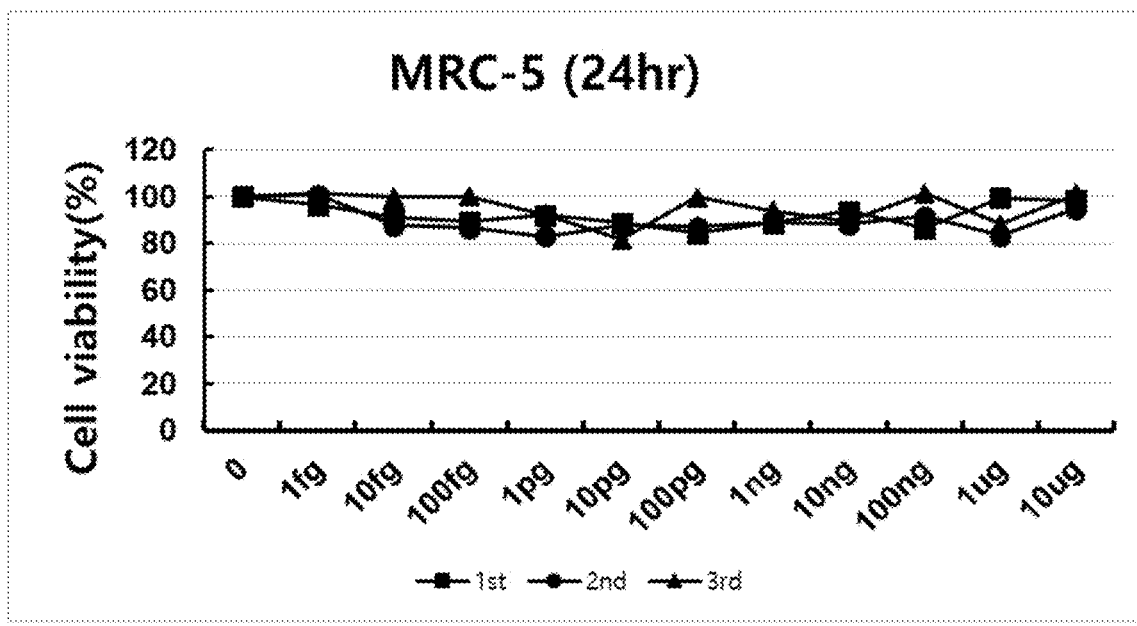

FIG. 11 shows changes in the intensity of MST fluorescence measured by titrating hACE2 (left) and PEP9 (right) in RBD.

FIG. 12 shows changes in cell viability when PEP9 was treated to cell lines for 24 hours. (A) Changes in cell viability by concentration when PEP9 was treated to a HEK293T cell line for 24 hours, (B) changes in cell viability by concentration when PEP9 was treated to a HepG2 cell line for 24 hours, (C) changes in cell viability by concentration when PEP9 was treated to an HMC-3 cell line for 24 hours, and (D) changes in cell viability by concentration when PEP9 was treated to an MRC-5 cell line for 24 hours FIG. 13 shows changes in cell viability when PEP9 was treated to cell lines for 48 hours. (A) Changes in cell viability by concentration when PEP9 was treated to a HEK293T cell line for 48 hours, (B) changes in cell viability by concentration when PEP9 was treated to a HepG2 cell line for 48 hours, (C) changes in cell viability by concentration when PEP9 was treated to an HMC-3 cell line for 48 hours, and (D) changes in cell viability by concentration when PEP9 was treated to an MRC-5 cell line for 48 hours.

BEST MODE FOR CARRYING OUT THE INVENTION

The present disclosure provides a peptide which includes an amino acid sequence represented by SEQ ID NO: 1 and specifically binds to a receptor binding domain (RBD) of corona virus.

Specifically, the peptide may inhibit binding between RBD of corona virus and angiotensin-converting enzyme 2 (ACE2), but is not limited thereto.

Specifically, the corona virus may be SARS-CoV2, but is not limited thereto.

Specifically, the peptide may bind to D420 and K458 of SARS-CoV2 RBD, but is not limited thereto.

The peptide of the present disclosure may be easily prepared by chemical synthesis known in the art (Creighton, Proteins: Structures and Molecular Principles, W. H. Freeman and Co., NY, 1983). Representative methods include liquid or solid phase synthesis, fragment condensation, F-MOC, or T-BOC chemical methods (Chemical Approaches to the Synthesis of Peptides and Proteins, Williams et al., Eds., CRC Press, Boca Raton Florida, 1997: A Practical Approach, Athert on & Sheppard, Eds., IRL Press, Oxford, England, 1989), but not limited thereto.

In addition, the peptide of the present disclosure may be prepared by a genetic engineering method. First, a DNA sequence encoding the peptide is synthesized according to a conventional method. DNA sequences may be synthesized by PCR amplification using appropriate primers. DNA sequences may be synthesized by other standard methods known in the art, for example, using an automatic DNA synthesizer (e.g., those sold by Biosearch or Applied Biosystems). The prepared DNA sequence is inserted into a vector including one or more expression control sequences (e.g., promoter, enhancer, etc.) that are operatively linked to the DNA sequence to regulate the expression of the DNA sequence, and transform a host cell with the recombinant expression vector formed therefrom. The produced transformant is cultured under an appropriate medium and conditions to express the DNA sequence to harvest a substantially pure peptide encoded by the DNA sequence from a culture. The harvest may be performed using a method known in the art (e.g., chromatography). The term 'substantially pure peptide' as used herein refers to a state that the peptide according to the present disclosure does not substantially include any other proteins derived from the host.

In the present disclosure, the peptide represented by the amino acid sequence of SEQ ID NO: 1 is a concept including a functional variant thereof. The term "functional variant" as used herein refers to all similar sequences in which some amino acid substitutions occur at amino acid position that do not affect the properties of the peptide of the present disclosure.

In addition, the present disclosure provides a polynucleotide encoding the peptide.

Preferably, the polynucleotide may be represented by SEQ ID NO: 2, but is not limited thereto.

The term "polynucleotide" as used herein refers to a polymer of deoxyribonucleotides or ribonucleotides that exist in single-stranded or double-stranded form. The polynucleotide includes RNA genomic sequences, DNA (gDNA and cDNA) and RNA sequences transcribed therefrom and also includes analogs of natural polynucleotides unless otherwise specified.

The polynucleotide includes not only the nucleotide sequence encoding the peptide, but also a sequence complementary to the sequence. The complementary sequence includes not only perfectly complementary sequences, but also substantially complementary sequences.

In addition, the polynucleotide may be modified. Such modifications include additions, deletions or non-conservative substitutions or conservative substitutions of nucleotides. The polynucleotide encoding the amino acid sequence is construed to include a nucleotide sequence showing substantial identity to the nucleotide sequence. The substantial identity may refer to, when the nucleotide sequence and any other sequence are aligned to the maximum correspondence and the aligned sequence is analyzed using an algorithm commonly used in the art, a sequence showing at least 80% homology, at least 90% homology or at least 95% homology.

In addition, the present disclosure provides a recombinant vector including the polynucleotide.

In addition, the present disclosure provides a transformant (provided that humans are excluded) transformed with the recombinant vector.

The term "vector" as used herein refers to a self-replicating DNA molecule used to carry a clonal gene (or another fragment of clonal DNA).

The term "recombinant vector" as used herein may refer to a plasmid, viral vector or other media known in the art capable of expressing the inserted nucleic acid in a host cell, and one that polynucleotides encoding the peptides of the present disclosure are operably linked to a conventional expression vector known in the art. The recombinant vector may include an origin of replication to generally enable proliferation in a host cell, and one or more expression regulatory sequences (e.g., promoter, enhancer, etc.) to regulate expression, a selective marker, and a polynucleotide encoding a peptide of the present disclosure operably linked to an expression regulatory sequence. The transformant may be transformed by the recombinant vector.

Preferably, the transformant may be obtained by introducing a recombinant vector including a polynucleotide encoding the peptide of the present disclosure into a host cell by a method known in the art, for example, but not limited to, transient transfection, microinjection, transduction, cell fusion, calcium phosphate precipitation, liposome-mediated transfection, DEAE dextran-mediated transfection, polybrene-mediated transfection, electroporation, gene gun, and other known methods for introducing a nucleic acid into the cell (Wu et al., J. Bio. Chem., 267:963-967, 1992: Wu and Wu, J. Bio. Chem., 263:14621-14624, 1988).

In addition, the present disclosure provides a composition for diagnosing corona virus infection, including the peptide as an active ingredient.

Preferably, the corona virus may be SARS-CoV2, but is not limited thereto.

The term "diagnosis" as used herein refers to identification of the presence or characteristics of a pathological condition. For the purposes of the present disclosure, diagnosis is to identify the presence or characteristics of corona virus infection.

Diagnosis of corona virus infection using the peptide of the present disclosure may be diagnosed by reacting the peptide of the present disclosure with the tissue or cell obtained directly from blood, urine or biopsy, followed by detection of binding thereof.

In addition, in order to easily identify, detect and quantify whether the peptide of the present disclosure binds to the RBD of the corona virus, the peptide of the present disclosure may be provided in a labeled state. In other words, it may be provided by being linked (e.g., covalently bonded or cross-linked) to a detectable label. The detectable label may be a chromogenic enzyme (e.g., peroxidase, alkaline phosphatase), a radioactive isotope (e.g., $^{124}$I, $^{125}$I, $^{111}$In, $^{99m}$Tc, $^{32}$P, $^{35}$S), a chromophore, a luminescent material or a fluorescent material (e.g., FITC, RITC, rhodamine, cyanine, Texas Red, fluorescein, phycoerythrin, and quantum dots).

Similarly, the detectable label may be an antibody epitope, a substrate, a cofactor, an inhibitor, or an affinity ligand. Such labeling may be performed during the process of synthesizing the peptide of the present disclosure or may be additionally performed on the pre-synthesized peptide. If a fluorescent substance is used as a detectable label, the corona virus infection may be diagnosed by fluorescence mediated tomography (FMT). For example, the peptide of the present disclosure labeled with the fluorescent substance may be circulated in the blood and the fluorescence by the peptide may be observed by fluorescence tomography. If the fluorescence is detected, it is diagnosed as corona virus infection.

In addition, the present disclosure provides a pharmaceutical composition for preventing or treating corona virus infection, including the peptide as an active ingredient.

Preferably, the corona virus infection may be COVID-19, but is not limited thereto.

The pharmaceutical composition of the present disclosure may be prepared using a pharmaceutically suitable and physiologically acceptable adjuvant in addition to the active ingredient, and a solubilizing agent such as an excipient, a disintegrant, a sweetener, a binder, a coating agent, a swelling agent, a lubricant, a polishing agent, or a flavoring agent may be used as the adjuvant. The pharmaceutical composition of the present disclosure may be preferably formulated into a pharmaceutical composition by including one or more pharmaceutically acceptable carriers in addition to the active ingredient for administration. In the composition formulated as a liquid solution, pharmaceutically acceptable carriers may be sterile and biocompatible and used by mixing saline, sterile water, Ringer's solution, buffered saline, albumin injection, dextrose solution, maltodextrin solution, glycerol, ethanol and one or more of these components, while other conventional additives such as antioxidants, buffers, and bacteriostats may be added as needed. In addition, diluents, dispersants, surfactants, binders, and lubricants may be additionally added to formulate into an injectable formulation such as an aqueous solution, suspension, and emulsion as well as pills, capsules, granules, or tablets.

The pharmaceutical formulation of the pharmaceutical composition of the present disclosure may be granules, powder, coated tablets, tablets, capsules, suppositories, syrups, juices, suspensions, emulsions, drops or injectable solutions, and sustained-release formulations of the active compound. The pharmaceutical composition of the present disclosure may be administered in a conventional manner via intravenous, intraarterial, intraperitoneal, intramuscular, intraarterial, intraperitoneal, intrasternal, transdermal, intranasal, inhalational, topical, rectal, oral, intraocular or intradermal routes. The effective amount of the active ingredient of the pharmaceutical composition of the present disclosure refers to an amount required for preventing or treating a disease. Therefore, the effective amount may be controlled by various factors including the type of disease, the severity of the disease, the type and content of the active ingredient and other ingredients included in the composition, the type of formulation and the age, weight, general health status, sex and diet of a patient, administration time, administration route and secretion rate of the composition, treatment period, and drugs used in combination with. For example, although not limited thereto, the composition of the present disclosure may be administered at a dose of 0.1 ng/kg to 10 g/kg when administered once to several times a day for adults.

In addition, the present disclosure provides a health functional food composition for preventing or ameliorating corona virus infection, including the peptide as an active ingredient.

The health functional food composition of the present disclosure may be provided in the form of powder, granule, tablet, capsule, syrup or beverage, which may be used together with other foods or food additives in addition to the active ingredient and also be appropriately used according to a conventional method. The mixing amount of the active ingredient may be appropriately determined depending on the intended use thereof, for example, prophylactic, health, or therapeutic treatment.

The effective dose of the active ingredient included in the health functional food composition may be used in accordance with the effective dose of the pharmaceutical composition, but in the case of long-term intake for health and hygiene or health control, it should be less than or equal to the above range, and it is certain that the active ingredient may be used in an amount beyond the above range since there is no problem in terms of safety.

The type of health food is not particularly limited, and examples may include meat, sausage, bread, chocolate, candy, snacks, confectionery, pizza, ramen, other noodles, gum, dairy products including ice cream, various soups, beverages, tea, drinks, alcoholic beverages, vitamin complexes, and the like.

In addition, the present disclosure provides a composition for drug delivery, including the peptide as an active ingredient.

Preferably, the drug may be an antiviral agent, and more preferably, the antiviral agent may be an antiviral agent against corona virus which may be SARS-CoV2, but is not limited thereto.

The peptide according to the present disclosure may be used as an intelligent drug carrier to selectively deliver drugs to corona virus. If the peptide of the present disclosure is used to treat corona virus infection by linking the peptide with a conventionally known drug, the drug may be selectively delivered only to the corona virus by the peptide of the present disclosure, such that the efficacy of the drug may be increased while the side effect of the drug is significantly reduced.

The drug is an antiviral agent, and as the antiviral agent that may be linked to the peptide of the present disclosure, there is no limit as long as it is conventionally used for the treatment of corona virus infection. The linkage between the antiviral agent and the peptide of the present disclosure may be performed by methods known in the art, for example, covalent bonding, crosslinking, and the like. To this end, if necessary, the peptide of the present disclosure may be chemically modified in a range in which the activity thereof is not lost.

MODES FOR CARRYING OUT THE INVENTION

Hereinafter, to help the understanding of the present disclosure, example embodiments will be described in detail. However, the following example embodiments are merely illustrative of the contents of the present disclosure, and the scope of the present disclosure is not limited to the following examples. The example embodiments of the present disclosure are provided to more completely explain the present disclosure to those of ordinary skill in the art.

<Example 1> 3D Structural Analysis of a Protein of a Peptide PEP9 for Treatment Of Corona Virus Infection COVID-19

1. Preparation of a 3D Structure of a Protein

A binding structure of hACE2-RBD registered in Protein Data Bank (PDB) (PDB ID: 6M0J, FIG. 1A) was used. The structure of a P6 moiety was modeled using MODELLER based on the binding structure of hACE2-RBD using the sequence (FIG. 1B) of 22~44-G-351~357 of hACE2 (FIG. 1C). For modeling of the PEP9 monomer, the modeling was conducted in the form combined with the RBD (FIG. 1D) using the sequence (FIG. 1B) in a Motif-22~44-G-351~357 type, and for the PEP9 dimer, a dimerization form of each monomer was modeled based on helix1 (20~53) and helix2 (55~81) of hACE2. VMD software was used for visualization of the 3D structure of proteins.

2. Molecular Dynamic Simulation

For the modeled hACE2-RBD complex, P6-RBD complex, PEP9 monomer-RBD complex, PEP9 dimer-RBD complex, P6, PEP9 monomer, and PEP9 dimer, molecular dynamics simulations to which the ff14SB force field was applied were performed using the AMBER18 package. The simulation was performed with the pmemd. cuda program included in AMBER18, and an octahedron TIP3P water box with a length of 15 Å added to the outer portion of the prepared protein was applied for the initial structure for the simulation. A periodic boundary condition was applied based on the water box, and Na+ and Cl— ions were added to neutralize the net charge. The particle-mesh Ewald (PME) method was applied for electromagnetic force of long distance based on a distance of 9 Å. The SHAKE algorithm to fix the distance of a covalent bond of hydrogen molecules was used, and the simulation was performed with a time step of 2 fs/step. First, a 5000-step minimization simulation was performed by applying 0.5 kcal/mol of a position restraint to the backbone structure of the protein, and a heating simulation was performed for 25 ps under NVT ensemble conditions from 10K to 300K by applying 0.1 kcal/mol of a position restraint. Equilibrium simulations were performed under NPT ensemble conditions at a temperature of 300K for 1 ns. The production run was performed under NPT ensemble conditions at a temperature of 300K and a pressure of 1 bar, and the simulation was performed for 500 ns for a complex with RBD and 1 μs for PEP9 alone. Simulations were performed with 5 independent trajectories for each case.

For PEP9 monomer and PEP9 dimer, analysis was conducted by dividing all snapshots of 1 μs×5 trajectories during the simulation for each PEP into 5 clusters using K-means clustering algorithm based on backbone RMSD. This structural clustering analysis was performed using the cpptraj program included in the AMBER18 package.

The binding energy of RBD and PEP9 were calculated by the MMGBSA algorithm using simulation snapshots within 300 to 500 ns, and entropy was calculated via normal mode analysis. The MMPBSA.py program in the AMBER18 package was used to calculate the binding free energy.

3. In-Silico Immunogenicity Analysis

In-silico immunogenicity was analyzed using the globally well-established NetMHC-4.0 server (http://www.cbs.dtu.dk/services/NetMHC/). For the amino acid sequence of PEP9, prediction was made on the binding of peptide-MHC class I for 81 MHC alleles of each difference individual (human) in the NetMHC4.0 server and 41 alleles of animals (monkey, cattle, pig, and mouse). By searching in peptide units of 13-14 amino acids in length, the total number of searched peptides and the number of peptides expected to have strong binding (SB) and weak binding (WB) thereamong were counted, and the ratio was calculated by (SB+WB)/Total to verify immunogenicity.

4. Structure of PEP9

Modeled PEP9 has a structure consisting of helix1 (3-11), turn (12-15), helix2 (16-45) and coil (46-54). When the structural ensemble of the modeled structure of the monomer and dimer forms in a solution was analyzed through molecular dynamics simulation, the structural patterns shown in FIGS. 2A and 2B were observed. K2 for interaction with D420 of RBD and D7 for interaction with K458 of RBD were placed in the N-terminus of PEP9. The PEP9 monomer and dimer modeled in the form bound to RBD (FIGS. 2C and 2D) maintained the combined structure with no significant structural change for 500 ns of simulation time (FIG. 2E).

5. Prediction of Binding Free Energy of PEP9-RBD

To figured out how well PEP9 binds to RBD, the binding energy and binding free energy were calculated (Table 1). hACE2 had binding energy of about-74 kcal/mol while P6 had weaker binding energy. In the case of PEP9, it may be found that a stronger binding to RBD was possible due to a similar or stronger binding energy with hACE2. Also, in terms of binding free energy, there were trajectories with negative binding free energy values for both monomer and dimer, meaning that PEP9 is capable of stably binding with RBD.

TABLE 1

| Peptide | traj. | RBD + monomer | | RBD + dimer | |
|---|---|---|---|---|---|
| | | ΔE (Kcal/mol) | ΔG (Kcal/mol) | ΔE (Kcal/mol) | ΔG (Kcal/mol) |
| hACE2 | 1 | −74.0327 | — | — | — |
| P6 | 1 | −36.7336 | 4.8968 | — | — |
| | 2 | −50.3396 | −5.1857 | — | — |
| | 3 | −63.9558 | −11.0060 | — | — |
| | 4 | −58.0396 | −10.4991 | — | — |
| | 5 | −47.1808 | −5.8078 | — | — |
| PEP9 | 1 | −75.8988 | −17.1972 | −61.6619 | −2.3411 |
| | 2 | −56.5827 | −0.5467 | −43.3957 | 14.0021 |
| | 3 | −79.8419 | −24.1726 | −54.3459 | 4.3517 |
| | 4 | −79.6983 | −17.5186 | −57.6187 | −0.4264 |
| | 5 | −58.1898 | −2.6128 | −85.4115 | −17.0580 |

6. Prediction of Immunogenicity of PEP

The degree of binding of PEP9 to the human immune system was calculated to predict the reactivity strength of the antibody against PEP9 (FIG. 3A). PEP9 was expected to have a very weak antibody response against humans and chimpanzees (FIG. 3B), wherein the immunogenicity value of PEP9 was about half lower than that calculated in the same way with other safely selling protein therapy drugs such as golimumab (immunosuppressant), infliximab (immunosuppressant), and interleukin 4 (allergy treatment) (FIG. 3C).

<Example 2> Cloning of Peptide PEP9 for Treatment of Corona Virus Infection COVID-19

1. Strain and Medium

All chemicals used for gene cloning were of analytical grade. Completed clones were transformed using a DH5a *E. coli* strain for proliferation and screened with LB medium in which ampicillin (LPS, 100 μg/ml) was added. Cell culture was performed at 37° C. with stirring involved.

2. Construction of Plasmids

After converting the amino acid sequence of the peptide designed in silico into nucleotides using the Sequence Manipulation Suite (https://www.bioinformatics.org/sms2/revtrans.html) tool, DNA sequences were determined by comparing with the sequence present in hACE2. The synthesized DNA fragment (Bioneer, gene synthesis) was amplified by PCR using a forward primer (5'-GGAGA-TATACATATGAAAAGTCAACTTGCTGATAATGTG) and a reverse primer (5'-GTGGTGCTCGAGCCT-GAAGTCGCCCTTCC) and then inserted into a pET-21a vector treated with restriction enzymes such as Nde I and Xho I by ligation independent cloning using EZ-Fusion™ HT Cloning Kit (Engnomics) (FIG. 4).

3. Experiment Result

The peptide of the present disclosure is a peptide of a new amino acid sequence that neutralizes or inhibits the S1-RBD protein from binding to the hACE2 protein, wherein the amino acid sequence and nucleic acid sequence of the peptide PEP9 designed in silico are shown in Table 2.

PEP9 is a peptide in which K2 for interaction with D420 of RBD and D7 for interaction with K458 of RBD are placed at N-terminus, ensuring more stabilized secondary structure.

TABLE 2

| PEP9 | Sequence |
|---|---|
| Amino acid sequence | MKSQLADNVYNTNITKENVQNM NEEQAKTFLDKFNHEAEDLFY QSSGLGKGDFR (SEQ ID NO: 1) |
| Nucleic acid Sequence | atgaaaagtcaacttgctgataat gtgtataacaccaatattactaaa gagaatgtccaaaacatgaatgag gaacaggccaagacatttttggac aagtttaaccacgaagccgaagac ctgttctatcaaagttcaggcctg gggaagggcgacttcagg (SEQ ID NO: 2) |

The plasmid of the completed PEP9 peptide was designed to have a stop codon placed on a peptide moiety consisting of 162 nucleotides and 6× His tag at C-terminal (FIG. 5).

<Example 3> Expression and Purification of Peptide PEP9 for Treatment of Corona Virus Infection COVID-19

1. Protein Expression and Purification Materials

All chemicals used for protein expression and purification were of analytical grade. Ampicillin, 1-thio-β-d-galactopyranoside (IPTG), sodium phosphate-monobasic, sodium phosphate-dibasic, and TRIS used for protein expression and purification were purchased from LPS (Daejeon, Korea), Coomassie brilliant blue R-250, 2-mercaptoethanol, chloramphenicol, and imidazole were purchased from Biosesang (Seongnam, Korea), sodium chloride was purchased from Duksan (Daejeon, Korea), and all columns were purchased from GE Healthcare (Piscataway, NJ). Phenylmethanesulfonyl fluoride (PMSF), trizma hydrochloride, and Amicon Ultra-15 Centrifugal Filter Units used herein were purchased from Millipore (Billerica, MA).

2. Protein Expression and Purification Instruments

Shake incubator (NBS/Innova 42R) and high-performance high-capacity centrifuge (Beckman Coulter. Inc./AVANTI JXN-26) were used for protein expression, and protein high-speed separation system (GE Healthcare/AKTA Pure M and Start System), protein high-speed separation system (GE Healthcare/FPLC Accessory System), ultrasonicator (Q700-Sonicator), and refrigerated centrifuge (Epoendorf-5810R) were used to isolate and purify proteins.

3. Expression of PEP9 Protein and Culture

The gene cloned in the pET-21a vector was transformed for expression using a BL21 (DE3) RIL *E. coli* strain, and cell culture was performed at 37° C. using LB medium in which ampicillin (100 mg/ml) and chloramphenicol (50 mg/ml) were added. After culture to meet $OD_{600}$ value of 0.6~0.8 ($OD_{600}$=0.6~0.8), 1M IPTG was added to a final concentration of 0.5 mM, followed by expression at 37° C. for 4 hours. A high-performance high-capacity centrifuge (Beckman Coulter. Inc./AVANTI JXN-26) set at 7000 RPM, 4° C. was used to harvest the cells for 20 minutes to be used immediately or stored at −80° C.

4. Isolation and Purification of PEP9 Protein

Figure 6:
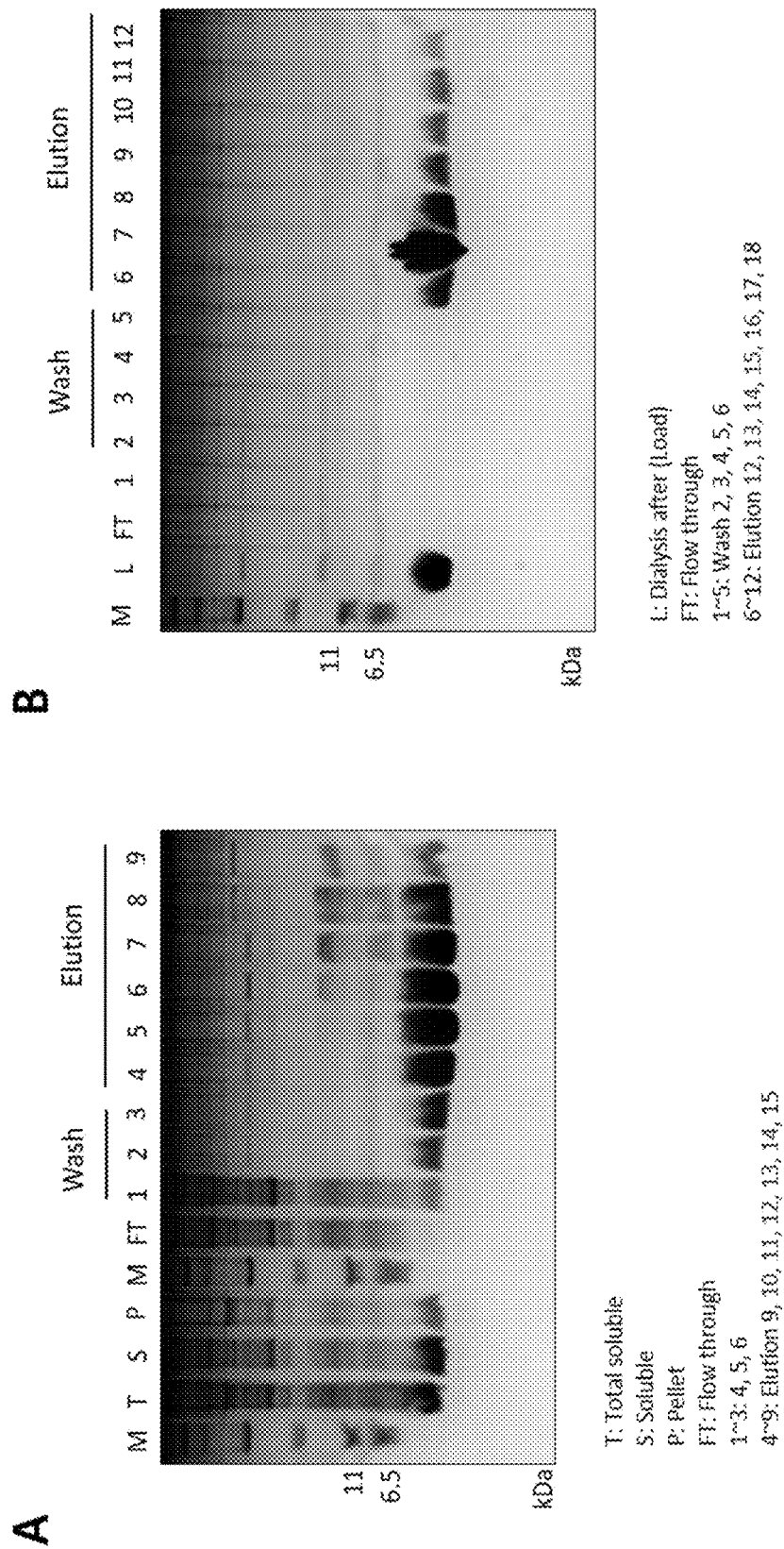
FIG. 6 shows results of SDS-PAGE of PEP9 expressed in E. coli. (A) PEP9 purified in BL21 (DE3) RIL cells. M: molecular weight markers, T: total cells after IPTG expression, S: aqueous solution after cell disruption, and P.

After dissolving in 10 ml of lysis buffer (pH 8.0, 50 mM Tris-HCl, 500 mM NaCl, 1 mM PMSF, 0.25% Tween-20 (v/v)) based on 1 g of cells, the cells were disrupted using a sonicator (Q700-Sonicator). In order to isolate the solution and the pellet, a high-speed centrifuge set at 18000 RPM and 4° C. was used for 30 minutes. A 0.45 μm syringe filter was used for removal of impurities in the aqueous solution. The solution from which impurities were removed was poured through a HisTrap HP 5 ml (GE Healthcare) column stabilized with Wash Buffer (pH 8.0, 50 mM Tris-HCl, 500 mM NaCl), and then Elution Buffer (pH 8.0, 50 mM Tris-HCl, 500 mM NaCl, 500 mM Imidazole) was set to 0 to 100% Gradient Elution. As a result, it was found that PEP9 was isolated with imidazole at a concentration of 100 to 300 mM (FIG. 6A). The isolated PEP9 was subjected to buffer exchange (pH 8.0, 20 mM Tris-HCl) in a cold room for 15 hours. After pouring the NaCl-removed PEP9 solution through the HiTrap Q HP 5 ml (GE Healthcare) column stabilized with Binding Buffer (pH 8.0, 20 mM Tris-HCl), Elution Buffer (pH 8.0, 20 mM Tris-HCl, 1.0 M NaCl) was set from 0 to 100% Gradient Elution. As a result, it was found that PEP9 was isolated with NaCl at a concentration of 120 to 250 mM (FIG. 6B). Finally, PEP9 having a dimer structure was purely isolated and purified using a HiLoad Superdex 75 16/600 column stabilized with pH 7.4, 10 mM phosphate buffer and 150 mM NaCl (FIG. 7A). As a result of quantification at $A_{280nm}$ using NanoDrop, a total of 35 mg of PEP9 was obtained at a concentration of 3.92 mg/ml, and as a result of calculating the purity using the ImageJ program, high purity PEP9 protein (>98%) was obtained (FIG. 7B).

<Example 4> Mass Spectrometry of Peptide PEP9 for Treatment of Corona Virus Infection COVID-19

1. Mass Spectrometry Analysis

Mass spectrometry was used to identify the total mass and information on the amino acid sequence of the protein. Mass spectrometry of total proteins was performed using a high-performance matrix laser desorption ionization mass spectrometer (Bruker, UltrafleXtreme MALDI TOF/TOF). Hybrid triple quadrupole linear ion trap mass spectrometer (Sciex, QTRAP) and quadrupole orbit trap mass spectrometer (Thermo scientific, Q Exactive PLUS) were used for amino acid sequence analysis for the protein and micro liquid chromatography (Sciex, M5 MicroLC) was used for QTRAP, and nano-micro liquid chromatography (Waters, ACQUITY UPLC M-Class system) was used for Q Exactive PLUS.

2. Sample Preparation for MALDI TOF and Analysis of Intact Proteins Using MALDI TOF For total mass spectrometry of ACE2, RBD, and PEP9 proteins, 10 μg of protein obtained by removing low-molecular compounds using Microcon centrifugal filter (Merck, MRCPRT010) and sinapinic acid (Bruker, 8201345) matrix were mixed in a 1:1 ratio, and the mixture was then placed on a target plate to dry and subjected to the flexcontrol program of the high-performance matrix laser desorption ionization mass spectrometer. The mass value was normalized using the Starter kit for MALDI-TOF MS (Bruker, 8208241), and the spectrum was obtained with an average of 1000 laser shots based on the method provided by flexcontrol. The result values were derived from each spectral data using the flexanalysis program.

3. Sample Preparation for LC-MS/MS Analysis

For amino acid sequence analysis of a single protein, 20 μg of RBD, hACE2, and PEP9) proteins were mixed with 100 mM triethylammonium bicarbonate (Sigma, T7408-100ML) and 2% sodium dodecyl sulfate (Duksan, 6645) to a specific concentration. After adding 10 mM dithiothreitol (BIO-RAD, 161-0611) and treating at 56° C. for 30 minutes, 20 mM iodoaetamide (Sigma, T1503) was added and shielded from light, followed by treatment at room temperature for 30 minutes. Then, using S-trap mini columns (PROTIFI, C02-mini-80), low molecular weight compounds were removed, and 2 μg of proteases including trypsin (Promega, V5111) and Glu-C(Promega, V1651) were added, followed by enzymatic degradation at 37° C. for 16 hours. After termination of the reaction, the peptide was isolated by a centrifuge and dried under vacuum, and 0.1% trifluoroacetic acid was added to prepare a sample. In addition, deglycosylation experiments were added for RBD and ACE2 proteins. For deglycosylation experiment, 100 mM triethylammonium bicarbonate and 2 μg of PNGase F (Promega, V4831) were added to the protease-treated sample, followed by enzymatic degradation at 37° C. for 16 hours. After termination of the reaction, the peptides were isolated by centrifugation using S-trap mini columns. Vacuum drying was followed, and then 0.1% trifluoroacetic acid was added to prepare a sample. For the RBD and hACE2 proteins, a quadrupole orbitrap mass spectrometer was used, and experiments proceeded via nano-micro liquid chromatography. For the PEP9 protein, a hybrid triple quadrupole linear ion trap mass spectrometer was used, and experiments proceeded using micro-liquid chromatography.

4. LC-MS/MS Analysis: ACQUITY UPLC M-Class System-Q Exactive PLUS

All solvents used for liquid chromatography were of HPLC grade. Water (Duksan, 7732-18-5) and acetonitrile (Honeywell, AH015-4) were used as solvents, and dimethyl sulfoxide (Sigma, 472301-1L), trifluoroacetic acid (Thermo scientific, 28904), and formic acid (Thermo scientific, 28905) were used as a medium in the experimental solution. Nano-micro liquid chromatography was composed of solvent A (0.1% formic acid, 5% dimethyl sulfoxide in water) and solvent B (0.1% formic acid, 5% dimethyl sulfoxide in 80% acetonitrile). Acclaim™ PepMap™ 100 C18 LC Column (Thermo scientific, 164197) was used as a trapping column, and EASY-Spray™ HPLC Columns (Thermo scientific, ES803A) as an analytical column. Liquid chromatography was performed for 5 minutes in the presence of 95% solvent A and 5% solvent B at a flow rate of 8 μl/min in the trapping step after injecting 0.5 μg of the sample. In the analytical stage, the flow rate was 250 nl/min. After 5 minutes under the conditions of 95% solvent A and 5% solvent B, the samples were analyzed by gradually increasing the rate of solvent B from 5% to 40% for 140 minutes, the column was activated for 15 minutes after increasing to 95% for 5 minutes again, and re-equilibration was followed by decreasing the rate of solvent B to 5% for 5 minutes and maintaining the state for 40 minutes. Pierce™ LTQ Velos ESI Positive Ion Calibration Solution (Thermo scientific, 88323) and quadrupole orbitrap mass spectrometer were used to calibrate the mass values. The analysis was conducted via full-MS and data dependent MS/MS methods. The calculated data was obtained using a proteome discoverer (Thermo scientific).

5. LC-MS/MS Analysis: M5 MicroLC-QTRAP

The column used for the analysis was a Kinetex 2.6u XB-C18 100A (Phenomenex, 00B-4496-AC). Micro liquid chromatography was composed of solvent A (0.1% formic acid in water) and solvent B (0.1% formic acid in acetonitrile). The liquid chromatography was performed at a flow rate of 20 μl/min after injecting 1.5 μg of the sample. After 5 minutes under the conditions of 95% solvent A and 5% solvent B, the samples were analyzed by gradually increasing the rate of solvent B from 5% to 40% for 45 minutes, the column was activated for 4 minutes after increasing to 95% for 5 minutes again, and re-equilibration was followed by decreasing the rate of solvent B to 5% for 3 minutes and maintaining the state for 3 minutes. The hybrid triple quadrupole linear ion trap mass spectrometer and standard chemical kit (Sciex, 4406127) were used to calibrate the mass values. The analysis was conducted using Q3 MS and enhanced product ion method using information dependent acquisition. For the calculated data, the wiff file was converted to the mgf file using convert MS (proteowizard.sourceforge.net), and the results were obtained using searchGUI and peptide-shaker (compomics.github.io).

6. Results of Intact Protein Mass Spectrometry

The mass of the intact protein was measured using MALDI-TOF. The mass of RBD was 30 kDa. In addition to 30 kDa, the peak was a dimer, appeared along with a 60 kDa peak, a monomer with a charge (z) of 2 (m/z=15 kDa), and a trimer with a charge (z) of 2 (m/z=45 kDa). Considering that the mass of RBD calculated from the protein sequence is 25.9 kDa, it may be suggested that glycosylation caused the change in mass of 4.1 kDa. Similarly, the mass of hACE2 was measured to be about 102 kDa, and a dimer and a peak with a charge of 2 also appeared together. Considering that the mass of hACE2 calculated from the protein sequence is 84.4 kDa, it is suggested that the mass change of about 17.5 kDa was shown by glycosylation. PEP9 was measured to be 7.324 kDa, almost equal to the mass calculated from the sequence (FIG. 8).

7. Identification of Protein Sequences

LC-MS/MS analysis was performed to identify the sequences of RBD, hACE2, and PEP9. Each protein was subjected to peptide analysis using proteases such as trypsin and Glu-C, wherein, for RBD and hACE2, glycosylated N-linked Asn was found by searching for amino acid residues in which Asn was changed to Asp by enzymatic activity of PNGase F. FIG. 9 shows the sequence identified by cleavage with trypsin and Glu-C and the glycosylated Asn. Protein sequences were identified 69.69% for RBD, 84.26% for hACE2, and 100% for PEP9. Since RBD and hACE2 proteins were produced in a mammalian cell line unlike PEP9, it may be inferred that the amino acid sequences were not identified 100% by unknown post-translational modification (PTM) (FIG. 9).

Sequence analysis of the N and C-terminus is one of the means for identifying the state of the protein, and if the terminus of the protein is not identified, it may be considered as being degraded due to a problem in the preservation state of the protein. In the case of RBD and hACE2, the terminus of the proteins tends not to be identified (ID), so unless inaccuracy in the sequence or the effect of PTM matters, they are easily degraded, so care must be taken for preservation.

<Example 5> Secondary Structural Stability and Function/Efficacy Verification of Peptide PEP9 for Treatment of Corona Virus Infection COVID-19

1. Circular Dichroism (CD) Experiment

Far UV circular dichroism was measured for RBD (PBS buffer), hACE2 (PBS buffer), and PEP9 (pH=7.4, 10 mM sodium phosphate, 150 mM NaCl buffer). A JASCO-1500 machine was used with the protein concentration of 0.2 mg/ml and a quartz cell of 0.1 cm at a temperature of 20° C. Measurements were performed using a measurement speed of 20 nm/min, a bandwidth of 5 nm, and a digital integration time (D.I.T) of 4 seconds at a far UV wavelength of 190-250 nm. A graph was drawn by subtracting the data measured 5 times for the protein by the data measured 5 times for the buffer.

As a result, it was found that hACE2 is a protein having α-helix as a secondary structure, and RBD is a protein having a beta sheet as a secondary structure. It was found that PEP9 has both a helical structure and a coil structure (FIG. 10).

2. Microscale Thermophoresis (MST) Experiment

Fluorescence was attached to 100 µL of 8 µM RBD (PBS buffer with 0.05% Tween-20 added) using Monolith Protein Labeling Kit RED-NHS 2nd Generation. Ligand (hACE2 (PBS buffer) and PEP9 (pH7.4 10 mM sodium phosphate NaCl 150 mM buffer)) were prepared by 10 µL each with 16 concentrations from 16 µM to 0.488 nM using a 1:1 serial dilution. A mixed solution of 15 nM RBD and 8 µM-0.244 nM ligand was prepared by diluting the fluorescence-attached RBD to 30 nM and adding 10 µL of the RBD to each ligand of 16 concentrations. MST was measured 5 times for each ligand using a Monolith NT.115 machine with 60% excitation power and medium MST power. Kd (dissociation constant) value was calculated using Kdmodel of MO affinity analysis program provided by Monolith company. Experimental results having the median Kd value derived from 5 experiments are shown in a graph.

As a result, a change in fluorescence intensity according to a change in concentration was observed, indicating that both hACE2 and PEP9 bind to RBD. The Kd values representing the binding strength were 34.5 nM for PEP9 and 42.2 nM for hACE2 (FIG. 11). The Kd values of RBD and hACE2 are similar to that of 34.6 nM measured by using BLI (biolayer interferometry) and SPR (Surface Plasmon Resonance) in the Science paper (Wrapp et al, Science 367, 1260-1263 (2020)).

<Example 6> Toxicity Test for Peptide PEP9 for Treatment of Corona Virus Infection COVID-19

1. Cell Culture for PEP9 Toxicity Assay

The cell line used in the present disclosure was obtained from the Korea Cell Line Bank (KCLB, Seoul, Korea). Used as a culture medium for the human embryonic kidney cell line HEK293T and the human liver cancer cell line HepG2 was Dulbecco's modified eagle medium (DMEM, Hyclone, USA) supplemented with 10% fetal bovine serum (FBS, Hyclone, USA) and 1% antibiotic (penicillin-streptomysin: P/S, Gibco, USA), and human microglia HMC-3 was cultured in Minimum Essential Media (MEM, Gibco, USA) supplemented with 10% fetal bovine serum and 1% antibiotic (penicillin-streptomycin). Used as a culture medium for human normal lung cell line MRC-5 was Minimum Essential Media (MEM) supplemented with 10% fetal bovine serum, 1% antibiotic (penicillin-streptomycin) and 25 µM hydroxyethyl piperazine ethane sulfonic acid (HEPES, Hyclone, USA). All cell lines used were cultured in an incubator controlled to a temperature of 37° C. in the presence of 5% $CO_2$.

2. Cytotoxicity Analysis for PEP9

The HEK293T, HepG2, HMC-3 and MRC-5 cell lines were dispensed into 96-well cell culture plates in the count of $3\times10^3$, $6\times10^3$, $5\times10^3$, and $6\times10^3$ cells/well, respectively, and then stabilized in an incubator controlled at a temperature of 37° C. in the presence of 5% $CO_2$ for 24 hours. Then, a starvation culture medium in which the FBS content was reduced from 10% to 1% in the culture medium composition for each cell line was prepared and replaced with a starvation culture medium, followed by starvation for 16 hours. Thereafter, 1 fg, 10 fg, 100 fg, 1 pg, 10 µg, 100 pg, 1 ng, 10 ng, 100 ng, 1 µg, and 10 µg of PEP9 were added to 100 µl of the culture medium, respectively, and the mixture was treated to the cell line, followed by culture for 24 hours and 48 hours. Viability of the cell lines was measured using Cell Counting Kit-8 (CCK-8, Dojindo, Kumamoto, Japan). After adding 10 μl of CCK-8 reagent per 100 μl of culture medium and culturing for 1 hour in the incubator controlled at a temperature of 37° C. in the presence of 5% $CO_2$, the optical density (O.D.) value was measured at absorbance at 450 nm using a SpectraMax iD3 microplate reader (Molecular Devices, San Jose, CA, USA), and the derived value was converted into a percentage.

3. Effect of PEP9 on Cell Viability of Each Cell Line

Figure 13A:
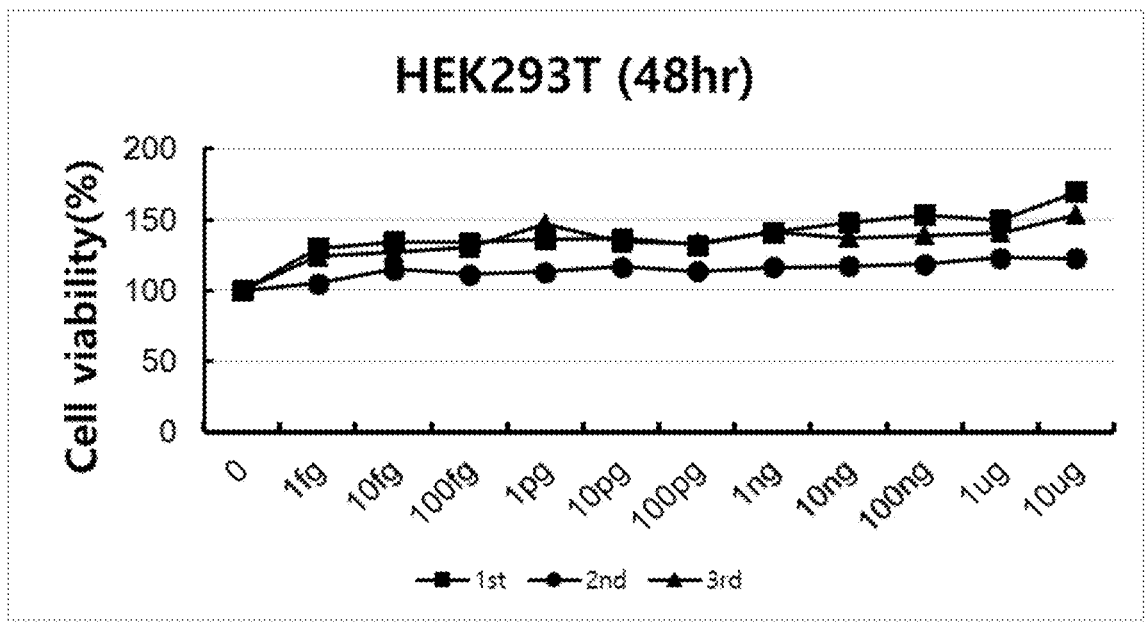
Figure 13B:
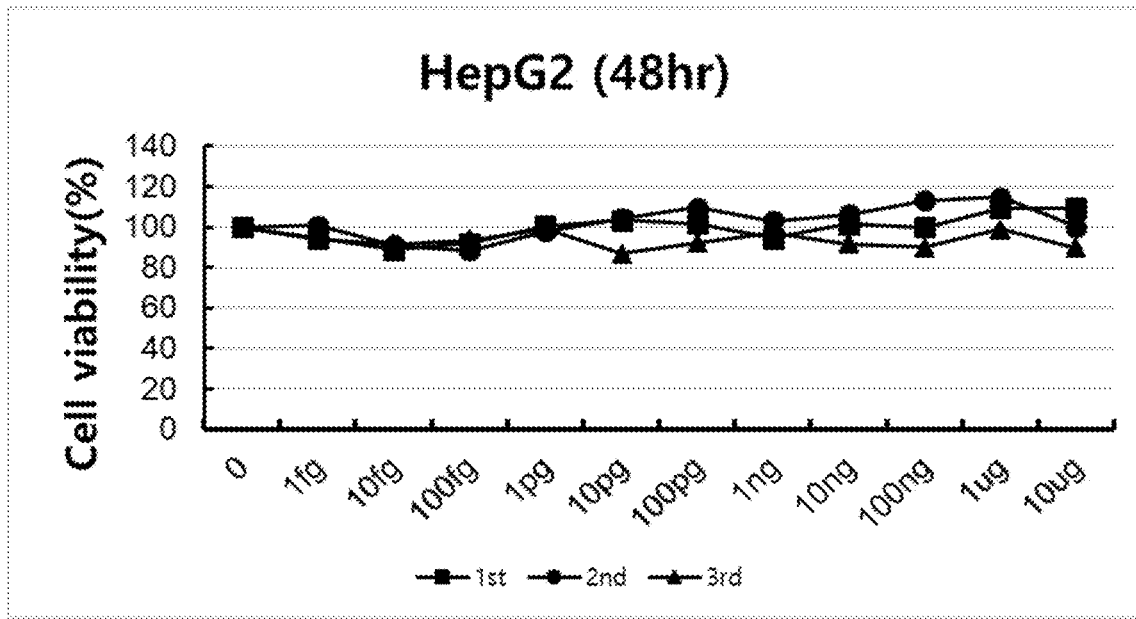
Figure 13C:
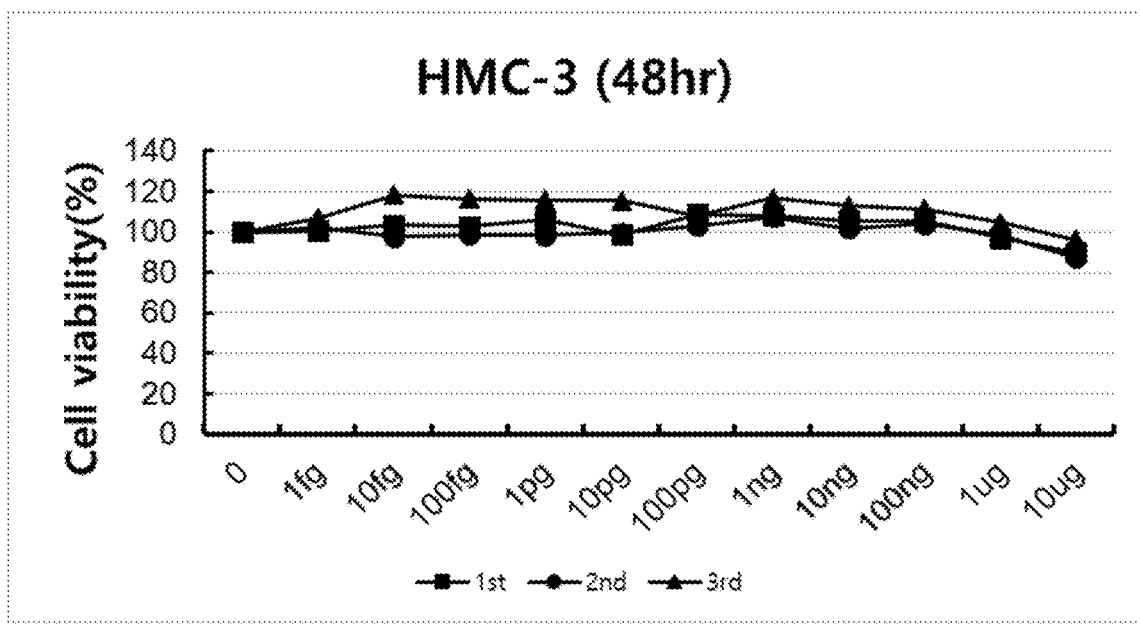
Figure 13D:
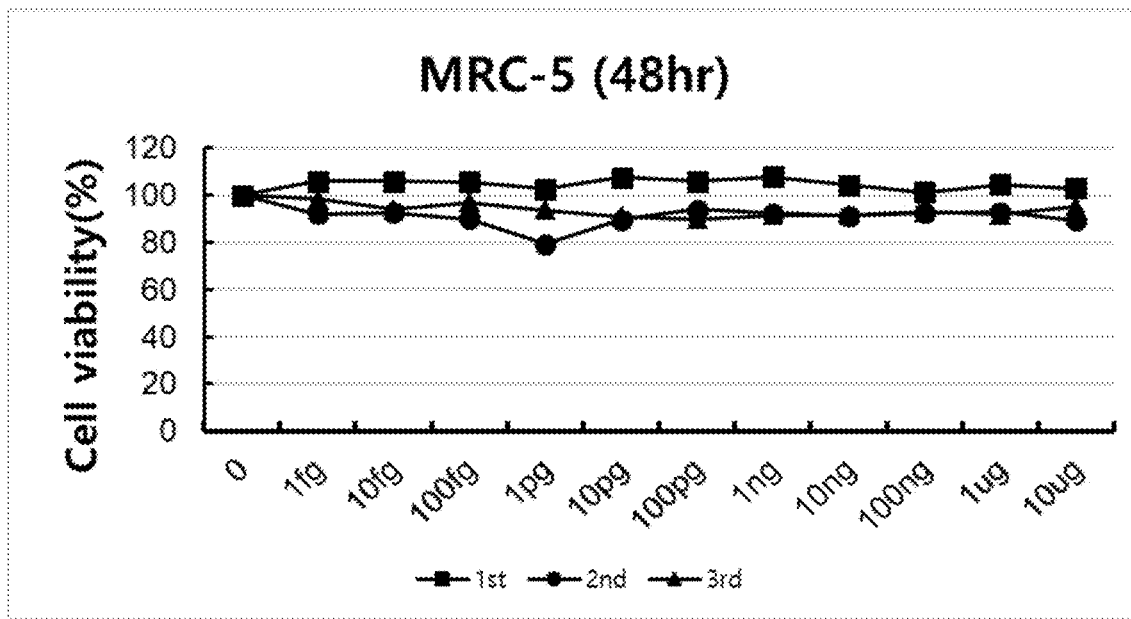

In the present disclosure, a CCK-8 assay was performed to check the toxicity of PEP9 in four cell lines including HEK293T, HepG2, HMC-3, and MRC-5, on the cell survival of each cell line. As a result, after treatment with PEP9 for 24 hours, when the cell viability of each cell line was checked, no significant change was observed in all four cell lines compared to the control group not treated with PEP9 (FIGS. 13A-D). In addition, after treatment with PEP9 for 48 hours, when the cell viability of each cell line was checked, no significant change in the cell viability was observed in HEK293T, HepG2, and MRC-5 cell lines (FIGS. 14A, B, D), but about 10% decrease in the cell viability was observed in the group treated with 10 μg of PEP9, which was the maximum concentration in the human microglia HMC-3 cell line, compared to the control group, showing very mild toxicity (FIG. 13C). However, it is judged that 10 μg as the maximum concentration of PEP9 at 48 hours is not a significant result since it is an excessive dose that is not practically realistic. Overall, the cytotoxicity analysis results proposed applicability of PEP9 for preventing and treating corona virus by finding the nontoxicity and safety of the PEP9 peptide.

As the specific part of the present disclosure has been described in detail above, for those of ordinary skill in the art, it is clear that the specific description is only a preferred embodiment, and the scope of the present disclosure is not limited thereby. Accordingly, it is intended that the substantial scope of the present disclosure is defined by the appended claims and equivalents thereof.

The invention claimed is:

1. A peptide comprising the amino acid sequence represented by SEQ ID NO: 1 which specifically binds to a receptor binding domain (RBD) of corona virus, wherein the corona virus is SARS-CoV2.

2. The peptide of claim 1, wherein the peptide inhibits binding between the RBD of corona virus and angiotensin-converting enzyme 2 (ACE2).

3. The peptide of claim 1, wherein the peptide binds to D420 and K458 of SARS-CoV2 RBD.

4. A method of detecting presence of a corona virus in a sample, comprising:
(i) contacting the sample with a peptide comprising the amino acid sequence represented by SEQ ID NO: 1; and
(ii) determining that the corona virus is present in the sample when the peptide binds to a receptor binding domain (RBD) of the corona virus,
wherein the corona virus is SARS-CoV2.

5. A pharmaceutical composition for drug delivery, comprising a peptide having the amino acid sequence of SEQ ID NO: 1 as an active ingredient, wherein the drug is an antiviral agent against SARS-CoV2.

6. The method of claim 4, wherein the peptide binds to D420 and K458 of SARS-CoV2 RBD.

7. The pharmaceutical composition of claim 5, wherein the peptide inhibits binding between an RBD of SARS-CoV2 and angiotensin-converting enzyme 2 (ACE2).

* * * * *